United States Patent [19]
Chiron et al.

[11] 3,992,734
[45] Nov. 23, 1976

[54] BONING MEAT

[75] Inventors: Gabriel Chiron, La Gaubretiere; Maurice Fradin, Saint Jean de Monts, both of France

[73] Assignee: Agence Nationale de Valorisation de la Recherche (ANVAR), France

[22] Filed: May 1, 1974

[21] Appl. No.: 465,971

[30] Foreign Application Priority Data

May 3, 1973 France .............................. 73.15824

[52] U.S. Cl. .................................................... 17/1 G
[51] Int. Cl.[2] ........................................... A22C 17/04
[58] Field of Search .................................. 17/1 G, 46

[56] References Cited

UNITED STATES PATENTS 3,581,337 6/1971 Tonjum et al. ........................ 17/1 G
3,593,369 6/1971 Anderson.............................. 17/1 G

*Primary Examiner*—Robert Peshock
*Attorney, Agent, or Firm*—William Anthony Drucker

[57] ABSTRACT

A plant for boning the meat of the half-carcass of a skinned beast, comprising a plurality of successive working stations where the still warm meat is removed by means of semi-automatic and automatic mechanical devices and, more precisely, on a first track, means for removal of the shoulder and means for cutting the neck and removing the fillet, top, top flank, thin flank, membrane, filet mignon and tail; on a second track, means for treating the cuts removed on the first track, e.g.: boning the leg and the "marrow bone", the blade bone being passed for stock purposes, boning the shoulder and, finally, on a third track followed by the residual carcass, means for boning the breast, the ribs and the thigh.

15 Claims, 43 Drawing Figures

14h
14
13
2
1
d
g
8d
8g
3
7
9
11
10
4
6
5
12
19a
22a
18
19
20
21
22
23
20a
21a 14
13
2
14h
23
22a
22
21a
21
12
20
20a
11
10
8d
8g
19a
19
9
6
18
7
5
3
4
d
g
1

25
24
31
33, 34
CG
26
27
31

30
28
29

28
CG
33
34
30
30
37
38
39
32
31

39
31
40
42
41

28
41
40
42
29
32
CG
39
38

31
31
35, 36
30
46
45
48
47
47
51
49
44
55
55
60
43
56
61
54

30
31
32
35
36
38
39
43
44
47
48
49
50
51
52
52
53
54
54
55
55
56
57
58
59
60

FIG. 11
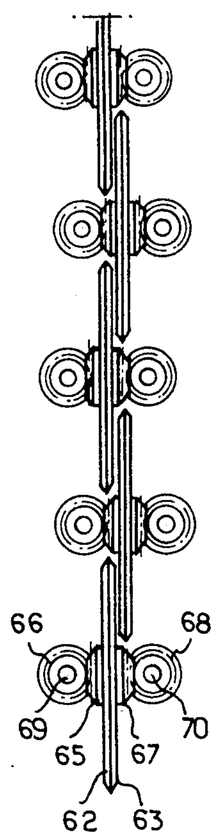
FIG. 9
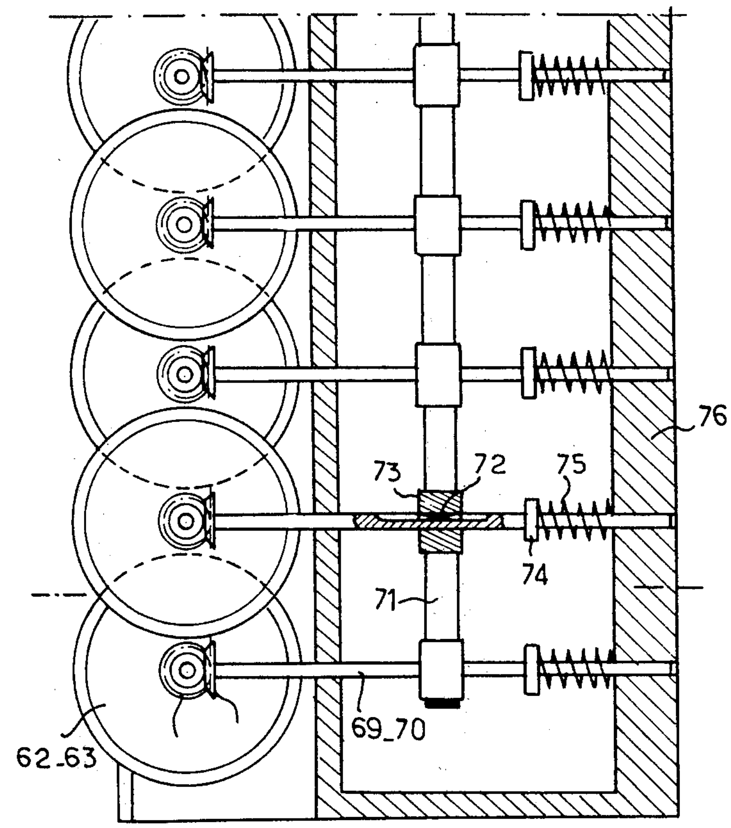
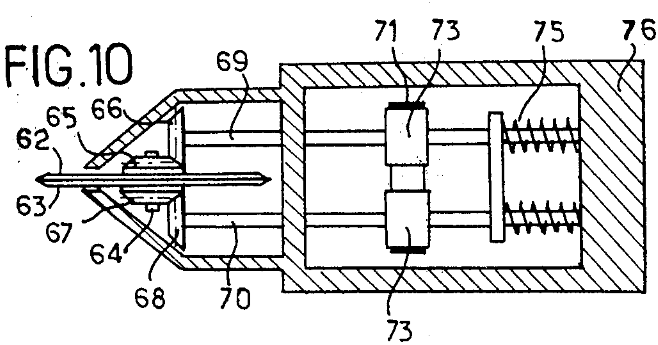

47
47
48
44
49
43

44
43
50
49
48
47

56
58
55
55
60
54

57
56
59
60
58
54

FIG. 18
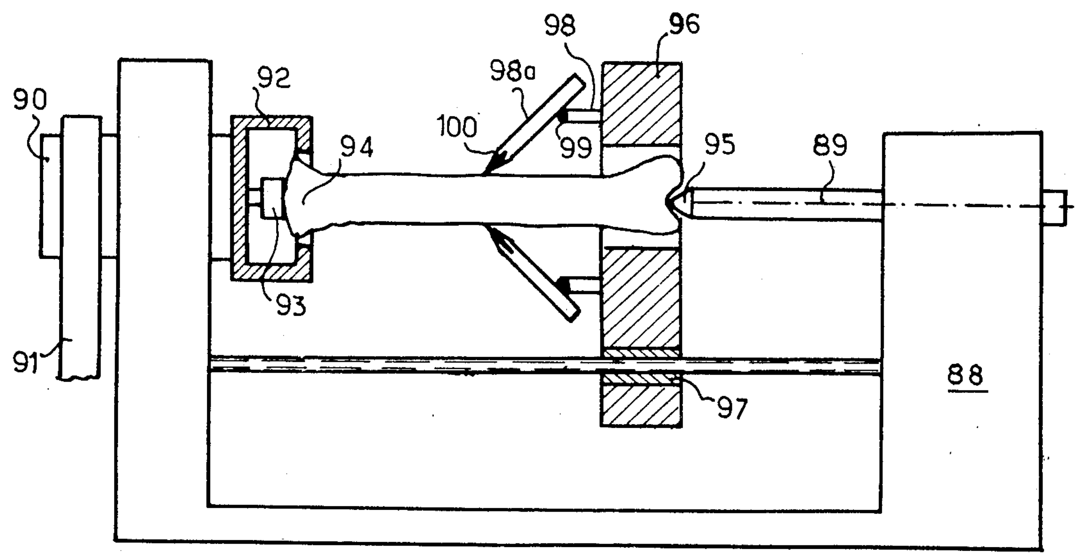
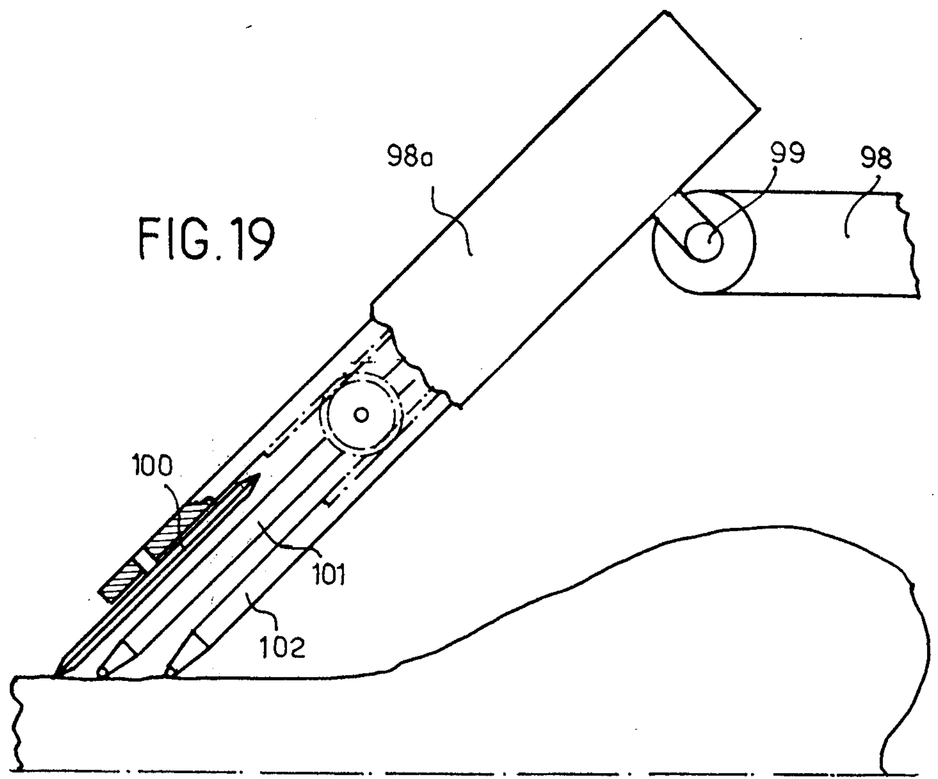

129
128
8
120
129
112
119
108
114
129
126
118
129
130
131
104
103
111
117
128
125
123
113
124
116
129
130
128
121
110
115
106
107
105

8
120
112
119
108
126
118
111
103
117
125
122
123
X
X
124
116
121
110
115

128
123
131
129
122
130
128

161
159
160
162
163
171
170
B
168
167
169
164
165
166
163

160
159
161
172
173
169
170
168
167

195
199
198
197
194
196

193
191
192
189
190

201
193
194
195
192
196
189

242
243
I
201
241
189

189
241
243

229
237
204
230
238
239
231
233
204
232
234
203
204

235
236

202
g
g
201 f
f
201b
202
202'
189
200
201

M.
220
212
213
228.
219
218
211
223
207
205
203
209
228
214
221
215
228.
228.
222
216
217

228a
M
203
203
203
203
M 206
208
224
227
226
225
203
204
204
205
207

Two upper symmetrical rails arrive at 1, bringing respectively on a first track the two half-carcasses *d* and *g*, right and left sides of an animal immediately following slaughtering, which comprises removal of the head and entrails, the meat still being warm, preferably at a temperature above 20°.

With reference to FIG. 1, the successive stations for processing the left-hand half of the carcass will first be listed and then described in detail.

Suspended from its rear knuckle (FIGS. 3 and 4), the carcass is directed in front of a station 3 where the shoulder is removed (FIGS. 5 and 6). conveyed by belt to the station 10, then to a station 4–5 where the neck is cut (FIGS. 7 and 8) and where also the fillet is removed. A first belt conveys this neck to the boning station 6 on a second track. A moving belt 7 carries to a central belt 8 (*g* and *d*): the fillet, the sirloin, the top of the flank, the thin flank, the filet mignon and the tail. Another conveyor belt 9 carries away the boned neck, the treatment of which is shown in FIGS. 16 and 17.

On the same working track, station 10 bones the leg and the marrow bone (FIGS. 18 and 19) yielding the blade bone for hot pot; the corresponding meat is carried by a conveyor belt 11 to the central belt 8. The shoulder is boned at station 12 (FIGS. 20 and 21).

On a third track, the residual carcass is detached from the rail and is driven by its hook onto an inclined table 18 (FIGS. 24 and 25), where it is pulled out straight (FIG. 26), subjected to treatment at a "first station" 19 for boning of the breast (FIGS. 27 and 28), and treatment at a "second station" 20 for boning of the ribs (FIGS. 29 and 30), and in a similar "third station" 21, followed by others 22, 23 for boning of the thigh, each station having a transverse belt such as 11 for carrying the meat to the belt 8 and specialised equipment **19*a*, 20*a*, 21*a* (FIGS. 31 to 36**).

FIG. 2 follows on from FIG. 1, showing at 2 the rotating distributor table where the two central belts **8*g* and 8*d* discharge. Guides 13 select and distribute the meat over eight conveyor belts 14 which end at a number of stations 15 described hereinafter (FIGS. 37 to 43), where the meat is prepared by external cooling to below 0°. Reference numeral 17** denotes a store and packaging room which completes the chain of operations embraced by the invention.

A ninth conveyor belt 14h carries to other processing rooms the meat which is to be minced. The corresponding installations come outside the present invention.

There will now follow a detailed description of the successive working stations.

In FIGS. 3 and 4, CG shows the left-hand half-carcass suspended by a hook 24 from an upper rail 25. The spinal column 26, sectioned in two, is visible, with ribs 27. The shoulder 28 is at the back of the carcass and the contour 29, shown by broken lines, shows the cutting line after it has been performed.

Posts 30 on the one hand support the rail 25 and on the other two pairs of drive belts 31 and 32 regulable in height and turning about two pairs of vertical axes 33 and 34, 35 and 36, between which the half-carcass will be driven from right to left in FIGS. 3 and 4 and towards FIGS. 5 and 6, 7 and 8 which follow on. Since the carcasses are of various thicknesses, the gap between the axes 33 and 34 on the one hand and 35 and 36 on the other (FIGS. 7 and 8) will be flexibly variable thanks to known means, not shown. The belts 31 and 32 could be articulated in the manner of a sprocket chain, or may be of a flexible material such as leather or plastics material. Reference numeral 37 denotes the driving teeth provided on the belts and these teeth are inclined preferably in the direction of drive. Posts 38 support a supporting bar 39 on which rests the lower drive belt 31 for correctly positioning the carcass when the shoulder is removed.

This removal is performed (FIGS. 5 and 6) by means of an apparatus 40 held on a base 41 comprising a series of rotating shears 42, the construction of which will be described hereinafter. Alternatively, the cutters could be replaced by two superposed saw blades vibrating in opposite directions, a principle which is already known. The shoulder is therefore detached by the carcass being propelled in front of the immovable apparatus 40.

FIGS. 7 and 8 show two simultaneous operations, removal of the fillet and cutting of the neck; the corresponding equipment is most clearly shown in isolation in FIGS. 12 and 13 and in FIGS. 14 and 15. A column 33 supports a sleeve 44 which is regulable in height by reason of a counterweight 45 and a suspended pulley 46. The sleeve 44 can be orientated and carries two tubular arms 47 in which slide two tubes 48 connected to an articulation 49 supporting a cutter assembly similar to that already shown at 42 and to be explained hereinafter. However, the cutter assembly has in this case an additional particular feature, each cutter support may, by virtue of a spring 50, slide at right-angles to the articulation 49 so that it can exert pressure, allowing the extreme cutting line of the cutters to match a variable curve, thus completing the 3° of liberty offered by the instrument once the height has been adjusted: rotation of the sleeve 44, slide 48, hinge 49. The shaded area 51 represents the fillet which is thus detached by operating the instrument in the direction of the arrow (FIG. 8) by means of two handles 52. It will be evident that this working station according to the invention is kept semi-automatic to allow a more accurate cutting of the fillet in view of the variety of carcasses.

The same FIGS. 7 and 8 show the apparatus for cutting the neck against a support 53 of a frame B (FIG. 8). The apparatus has two colums 54 supporting two sleeves 55 which can be regulated in height by known means, not show. These sleeves support a cylinder 56 in which slides a piston 57 holding a rod 58 which traverses a guide 59 and supporting a blade 60 for cutting the neck 61, the boning of which is explained hereinafter (FIGS. 16 and 17).

FIGS. 9, 10 and 11 diagrammatically show the mechanical composition of an assembly of rotating cutters. There are shown (FIGS. 10 and 11) two circular blades (62 and 63) which have their cutting faces in contact. They have a common axis 64 and rotate in opposite directions by virtue of bevel gears (65, 66) and (67, 68), the shafts, 69, 70 turning in parallel and in one and the same direction by reason of a belt 71. Alternatively, the blades could be rotated by compressed air, using a known technique. FIGS. 9 and 11 show a series of such cutters all jointly operated by one and the same belt or by any other known means connecting them to a motor, not shown. The pairs of axes or shafts such as 69, 70 with their corresponding cutters will be slidingly mounted by the provision of axial slots such as 72 which allow keying of the drive pinions 73. Abutments such as 74 allow the action of compressed springs 75 on the frame 76 containing the cutter assembly. FIG. 11 shows the cutters operating on

BONING MEAT

The invention relates to the boning of beef and meat from other quadrupeds and to the shaping of the meat for its distribution, particularly with individual packaging of the various cuts. According to the prior art, after slaughtering, the carcasses are placed in a cold room and are then transported to the point of distribution where, as needs arise, generally partial boning is performed by hand, as a skilled job, which is slow and bereft of appropriate hygienic proportions so that prolonged keeping is not allowed.

The object of the invention is a method which makes it possible to prepare and store, transport and distribute a fully boned meat which has been shaped by means of operations, the duration of which may be of the order of a few minutes from slaughtering of the animal, with no provision for the carcasses to be placed in a cold room. This method considerably reduces the cost of processing, storage and transport and permits of simplified use at the retail stage, and is capable of being carried out under particularly favourable conditions at sanitary level.

The method of boning and shaping according to the invention, applied to half-carcasses of the skinned beasts, is characterised by the sequence of boning operations performed on the hot meat while it is still supple and therefore detachable from the bone without tearing, and by the immediate shaping of the boned meat while it is still hot, by a forming operating which ends at a sufficiently low temperature for the outer surface of the meat to be brought to the vicinity of 0° C, the whole processing being performed without manual contact and in a sufficiently short time for germs to have no opportunity of contaminating the meat.

The invention also has as object a method of boning including boning of the brisket and ribs, from the half-carcass when this has been hung up so that the "marrow trough" is rendered rectilinear to provide a reference line for the action of mechanical boning tools.

Another object of the invention relates to a sequence of operations at successive working stations and to the plant for carrying out the method.

Already known is a machine for boning certain parts of a beef carcass and operating by milling, cracking the bone and seeking to extract the pasty mixture formed thereby. It must be acknowledged that this machine is far from satisfactory at the present time and that it wastes a considerable amount of meat around the crushed bones.

The method according to the invention is quite opposite to any such endeavour, since it consists in extracting the meat from around instead of destroying the bones.

In associated fields, a machine for the skinning of beasts and a machine for shearing through the neck have long since been known. But no overall plant comprising reasonable automatic facilities has been either provided nor suggested.

The ensuing description will reveal the advantages of the method with regard to the speed of working, the conditions which are particularly favourable to preservation of the meat from any contamination; the suitability of the tools of each working station will also be noted, certain stations being fully automatic while others are semi-automatic and remain available to specialists who have to use them and run them, making more-over certain additional cuts more rapidly and more positively than could be performed by an additional excessively complex and expensive mechanical apparatus.

The invention will be the better understood from the following description by way of example, and the attached diagrammatic drawings, in which:

FIGS. 9, 10 and 11, show, in elevation, in plan and in profile, an assembly of rotary shears;

Figure 7:
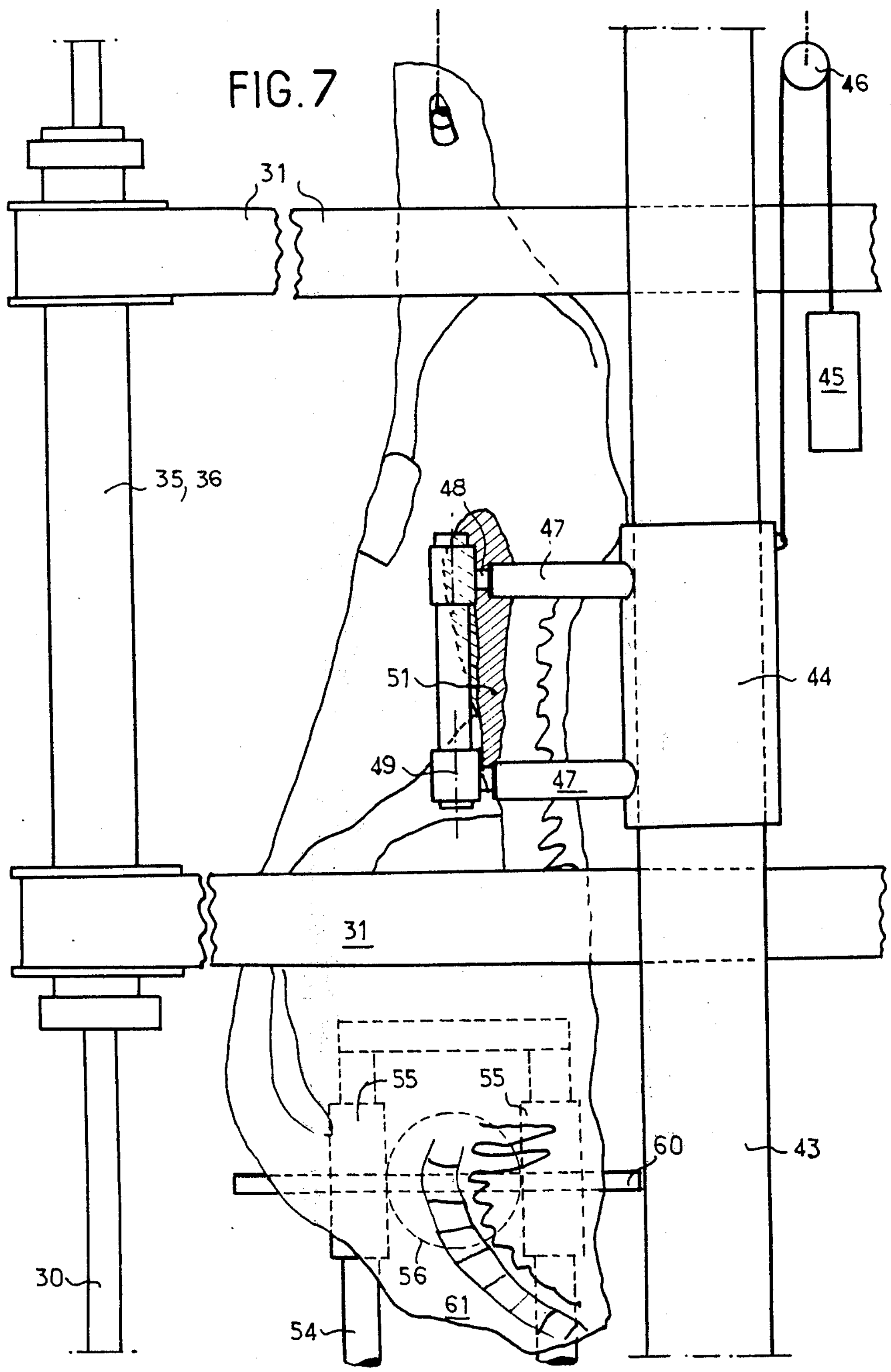
FIGS. 7 and 8 show the apparatus for cutting the neck and detaching the fillet, in elevation and in plan view.
Figure 8:
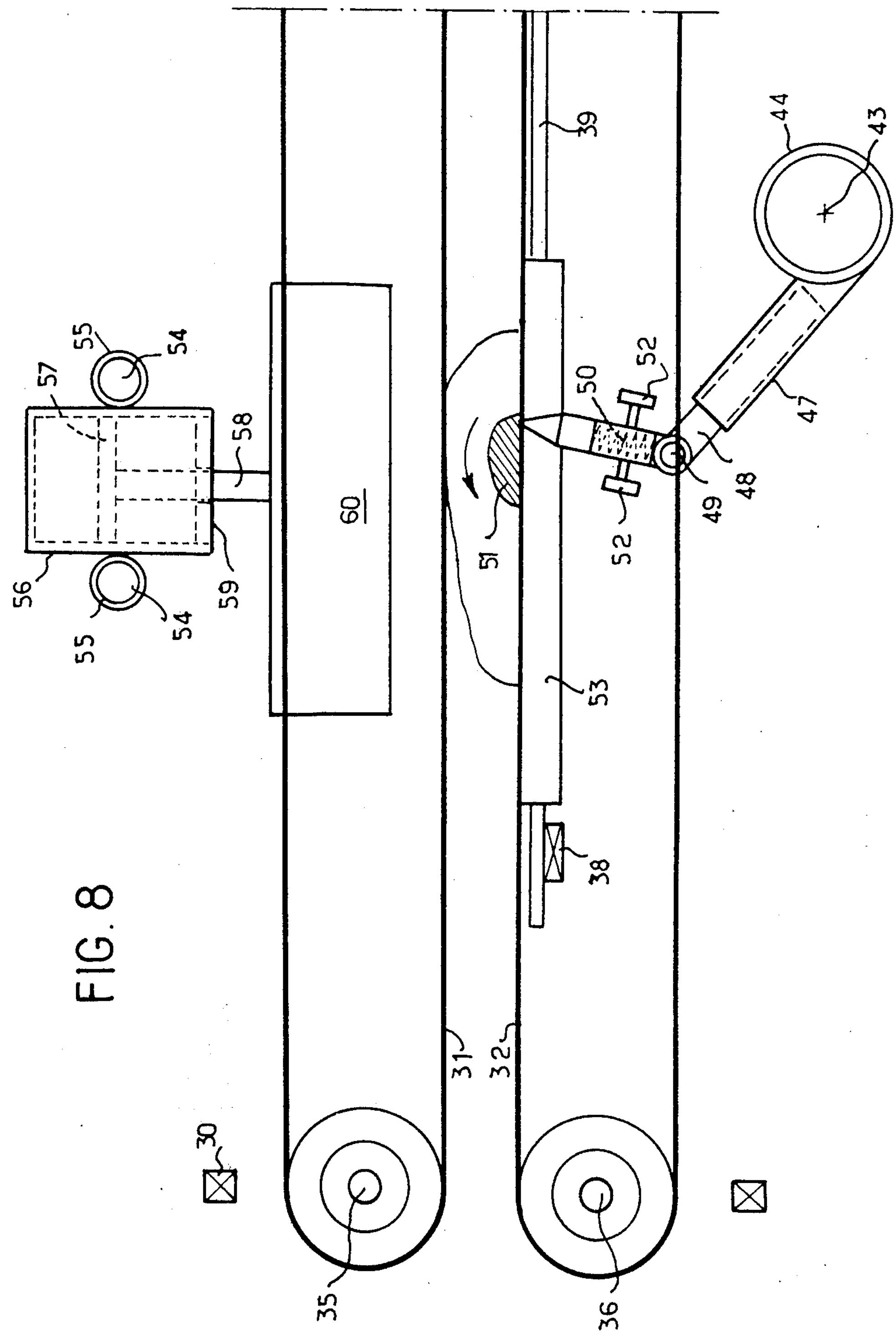
Figure 12:
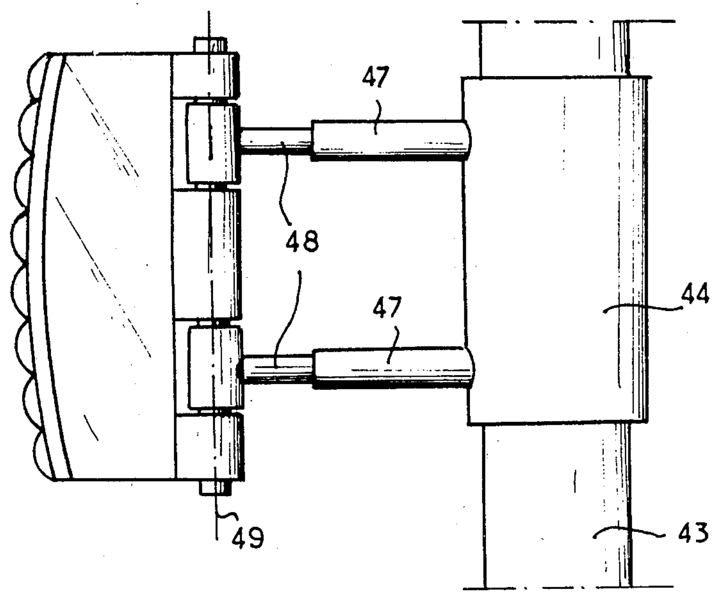
Figure 13:
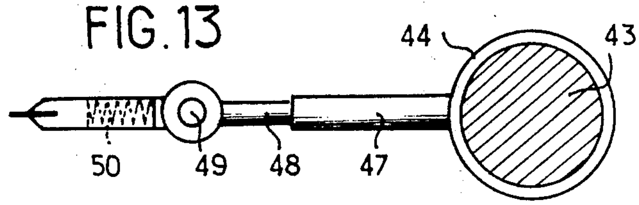
Figure 14:
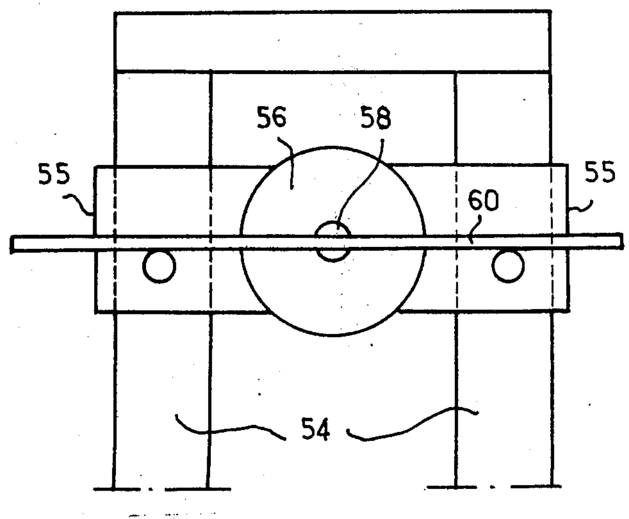
Figure 15:
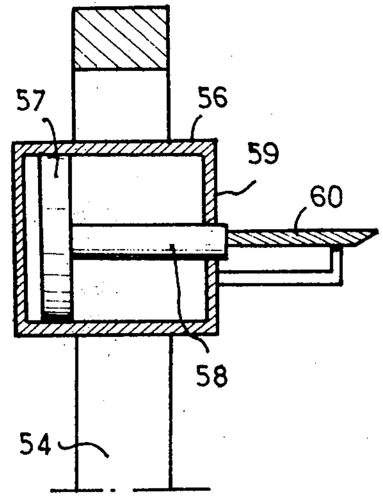
Figure 17:
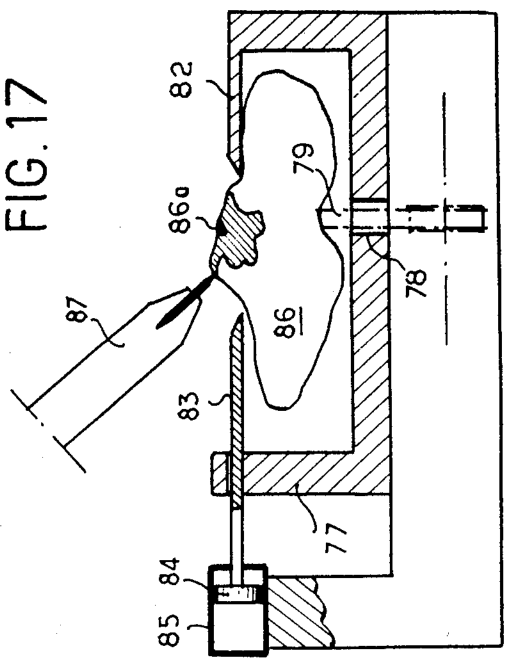
Figure 16:
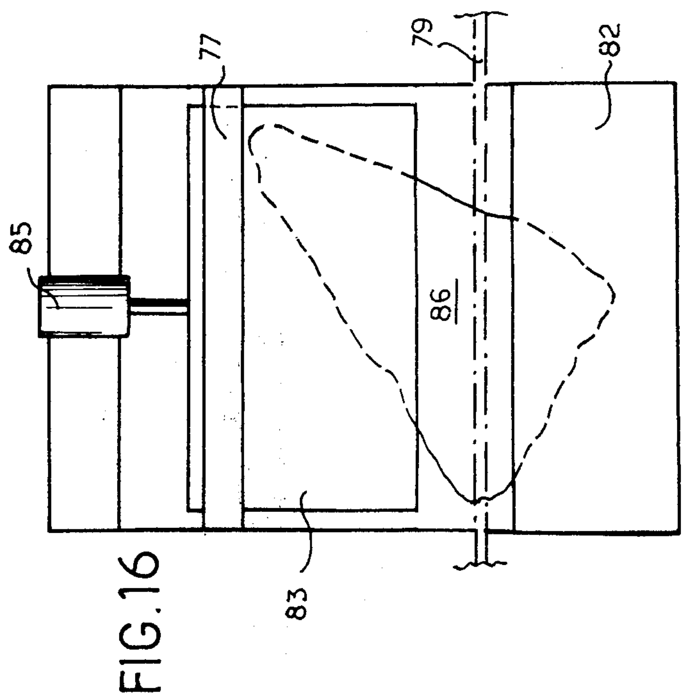

FIGS. 12 and 13 shown, in elevation and in plan view, the apparatus for detaching the fillet;

FIGS. 14 and 15 show, from the front and in profile, the apparatus for cutting the neck, already shown in FIGS. 7 and 8;

FIGS. 16 and 17 show, in plan and in section, the plant for boning the neck;

FIG. **16*a* shows a partial projection of 16;**

Figure 20:
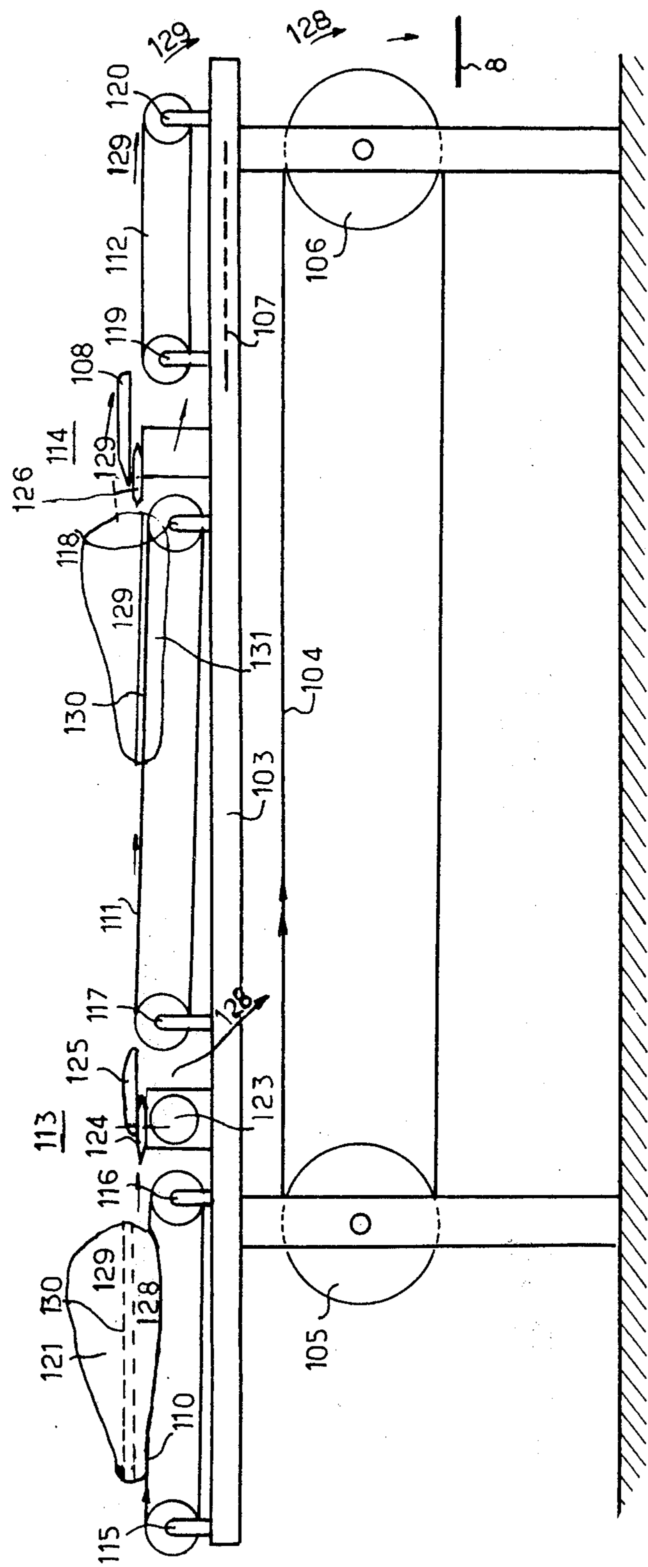
Figure 21:
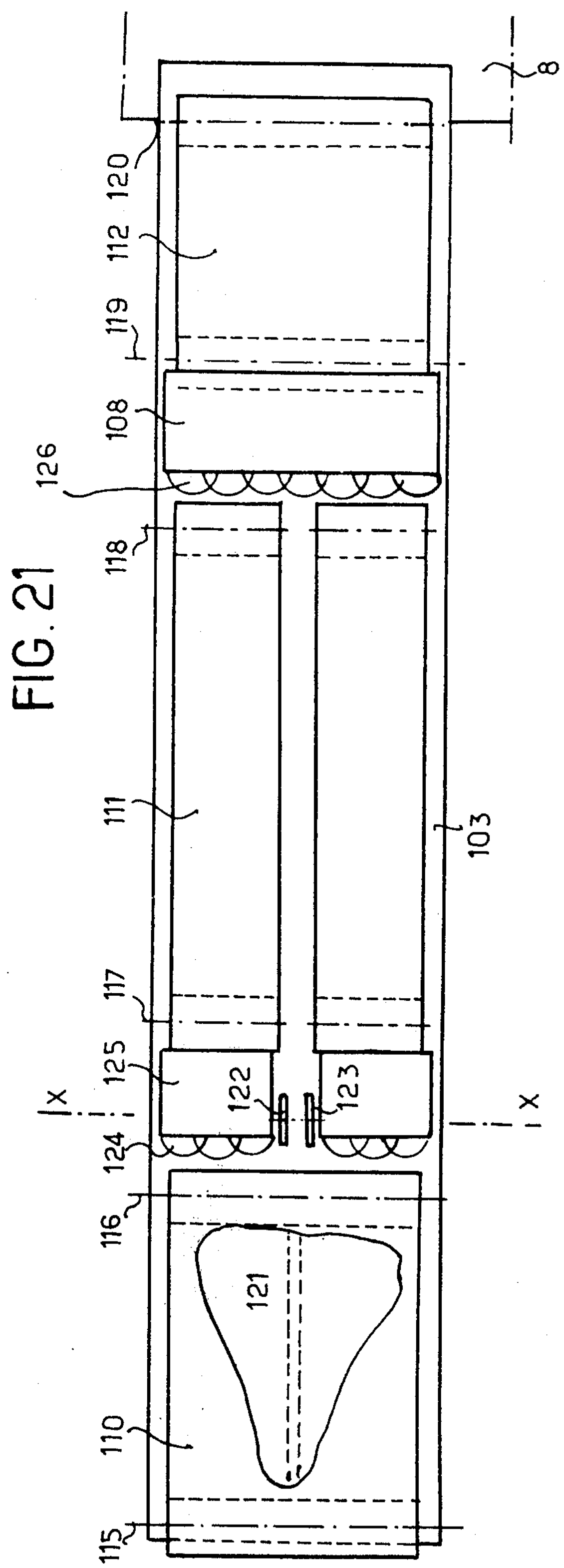
Figure 22:
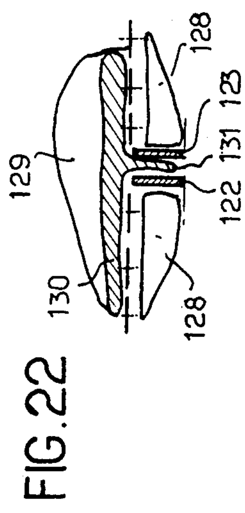
Figure 23:
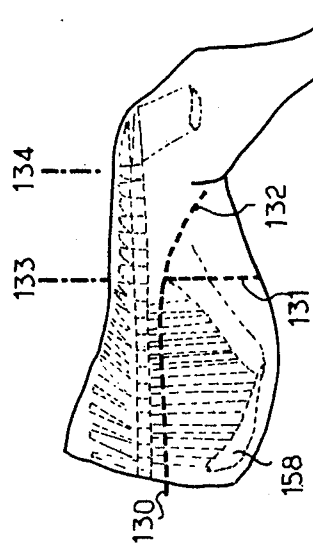
Figure 24:
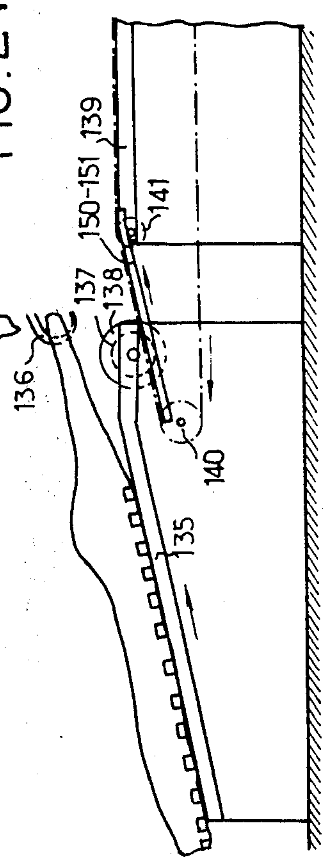
Figure 25:
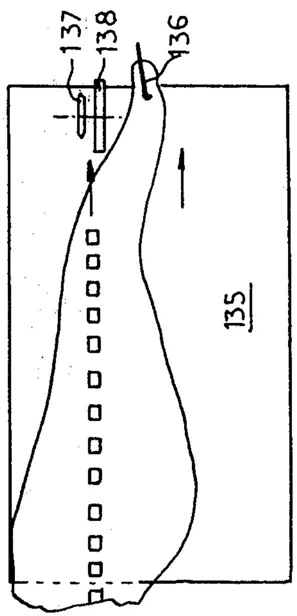
Figure 26:
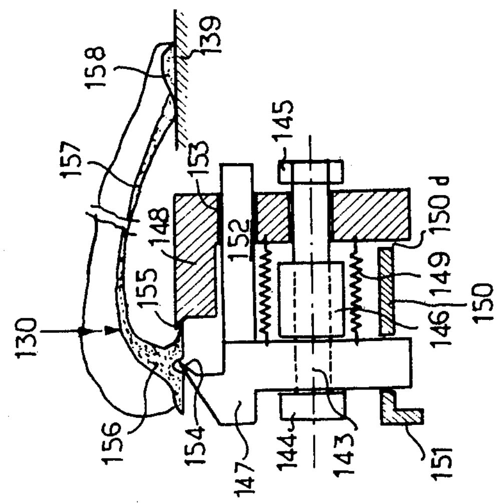
Figure 28:
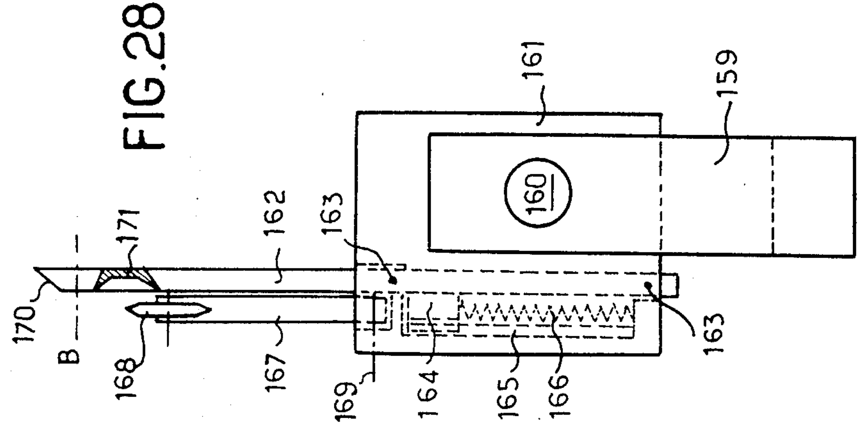
Figure 27:
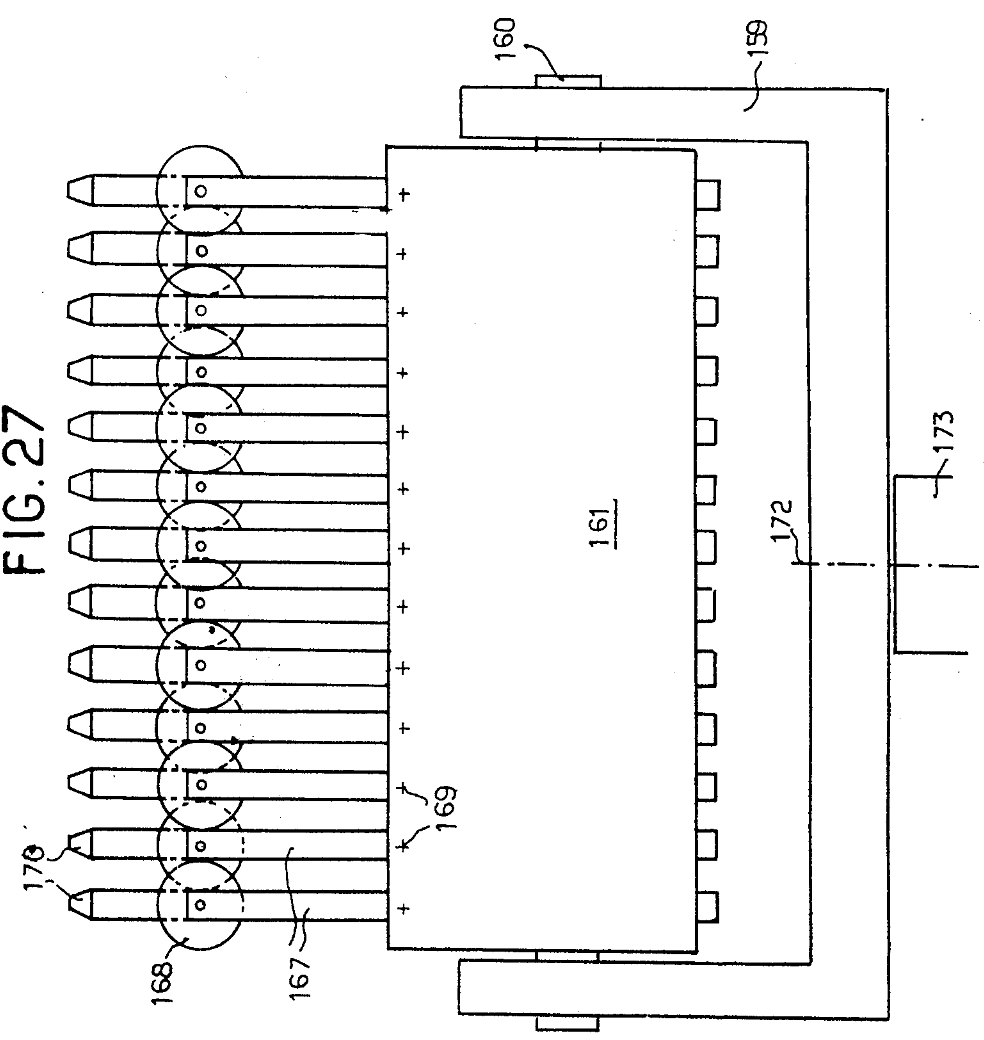
Figure 29:
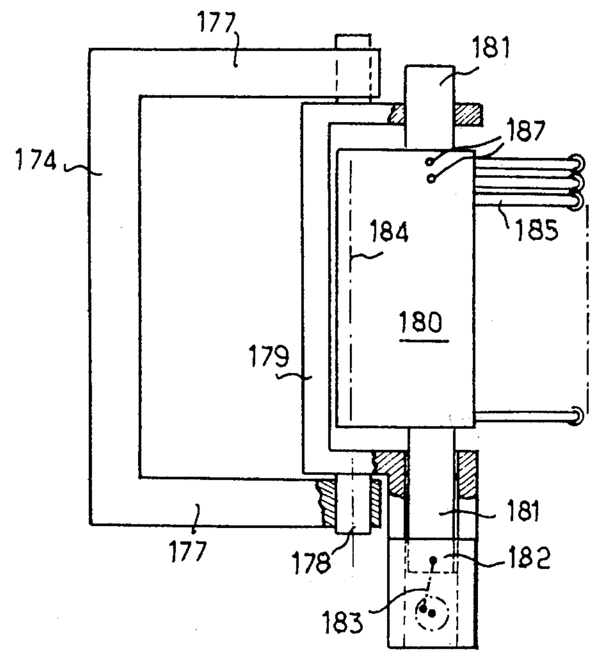
Figure 30:
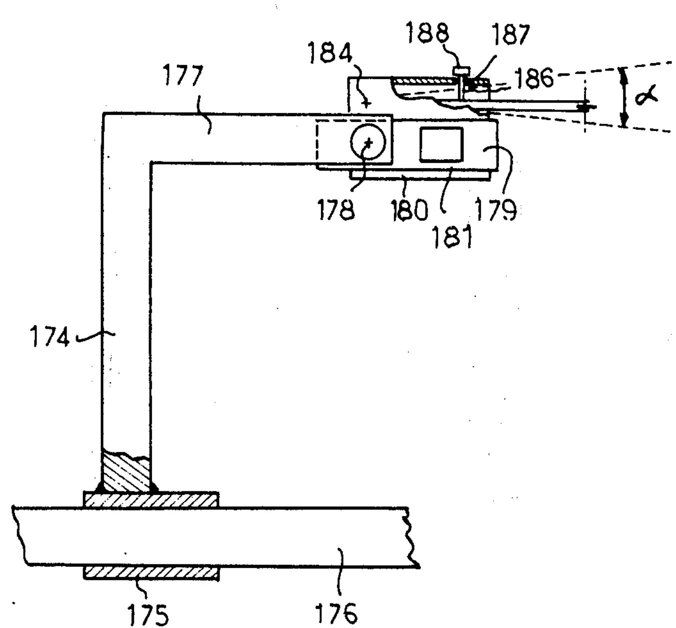
Figure 31:
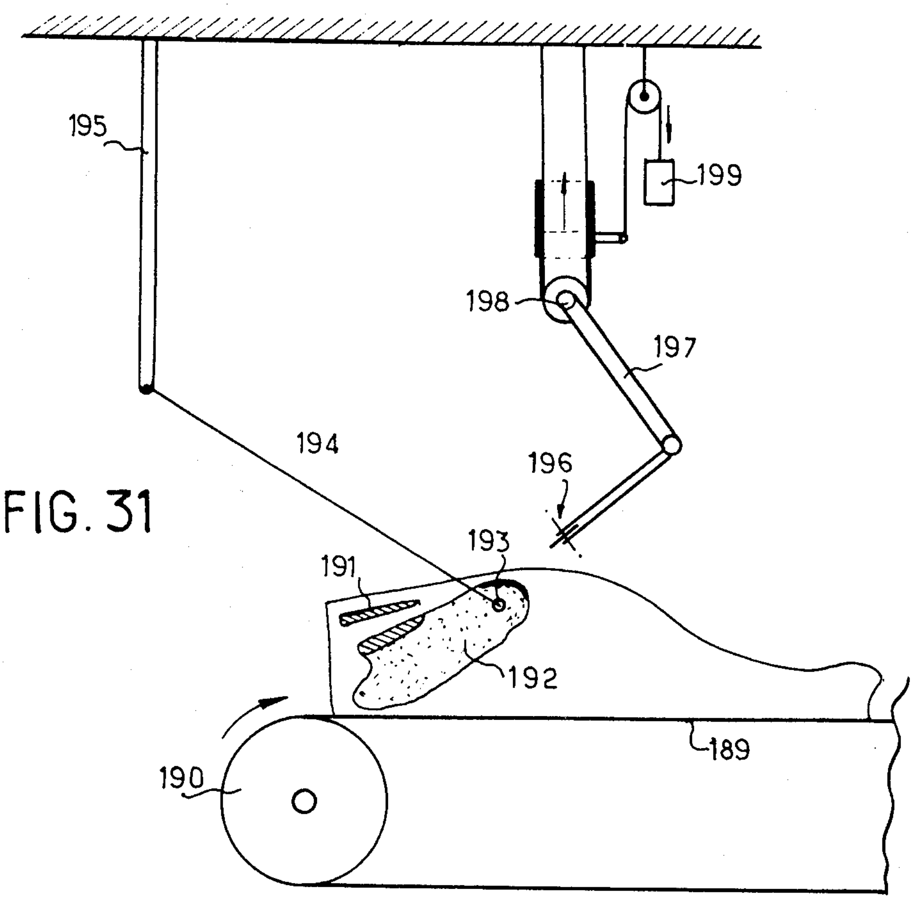
Figure 32:
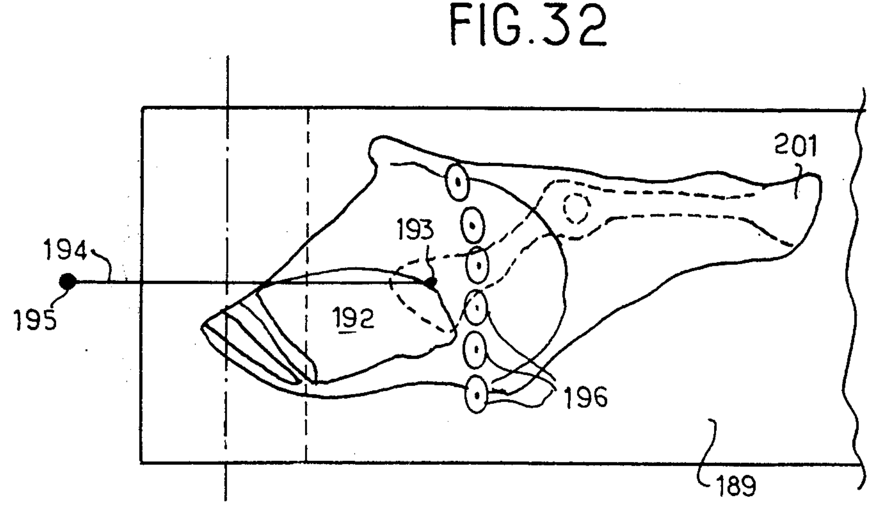
Figure 33:
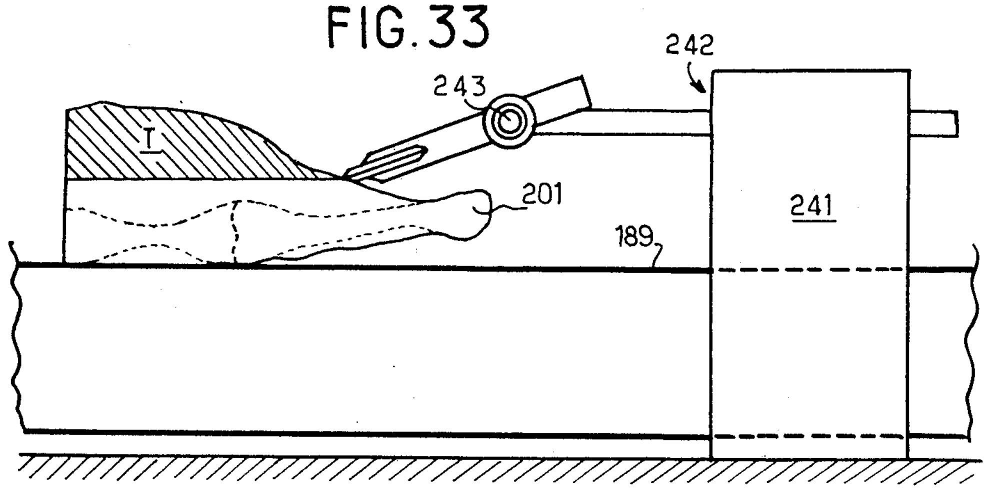
Figure 34:
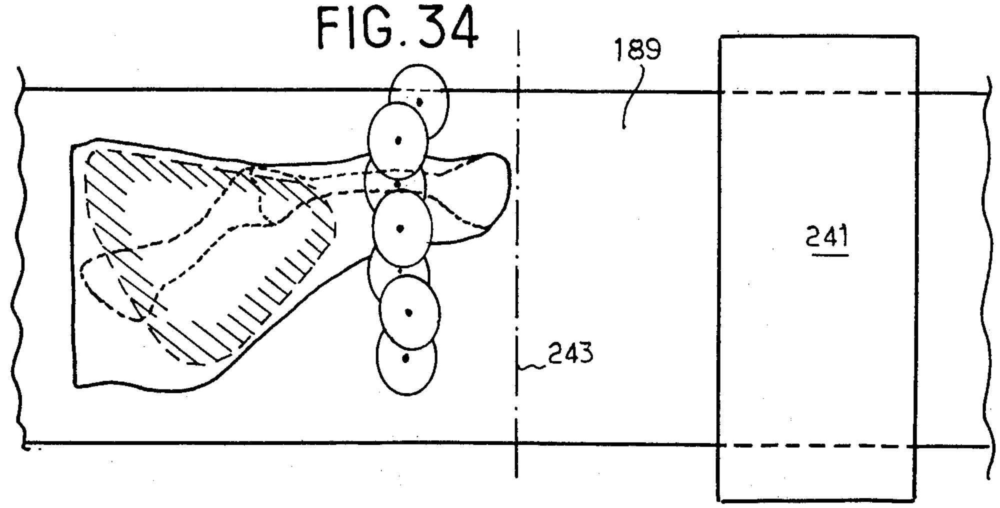
Figure 35:
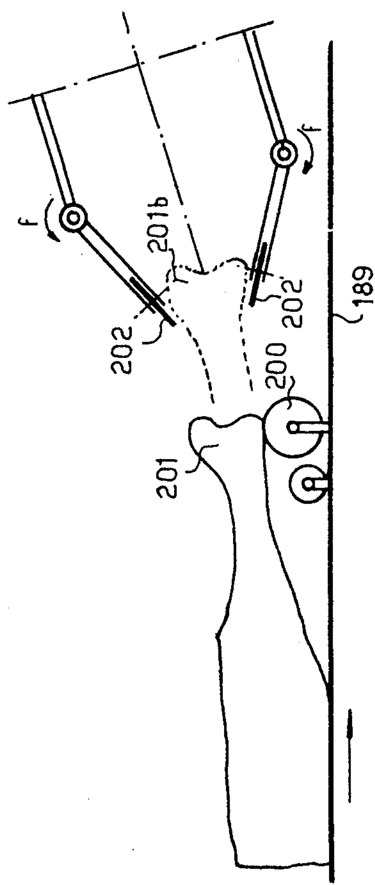

FIG. 18 shows in elevation the apparatus for boning the leg and the marrow bone;

FIG. 19 shows an enlarged detail from FIG. 18 showing the double sensor;

FIGS. 20 and 21 show, in elevation and in plan, the installation for boning the shoulder;

FIG. 22 shows a section viewed as indicated by the arrow F in FIG. 21;

FIG. 23 shows the residue of the half-carcass flat on its sectional plane;

FIGS. 24 and 25 show, in elevation and in plan, the inclined table for rectilinear hanging of the half-carcass;

FIG. 26 shows a section through the straight hanging and driving means;

FIGS. 27 and 28 show the apparatus for boning the breast, seen from above and in profile, in the "first station";

FIGS. 29 and 30 show the apparatus for boning the ribs, viewed from above and in profile, in "second station";

FIGS. 31 and 32 show in elevation and in plan view the boning of the chump end;

FIGS. 33 and 34 show in elevation and in plan view the apparatus for detaching the top rump;

FIG. 35 shows the apparatus for boning the leg and the thigh, and

Figure 40:
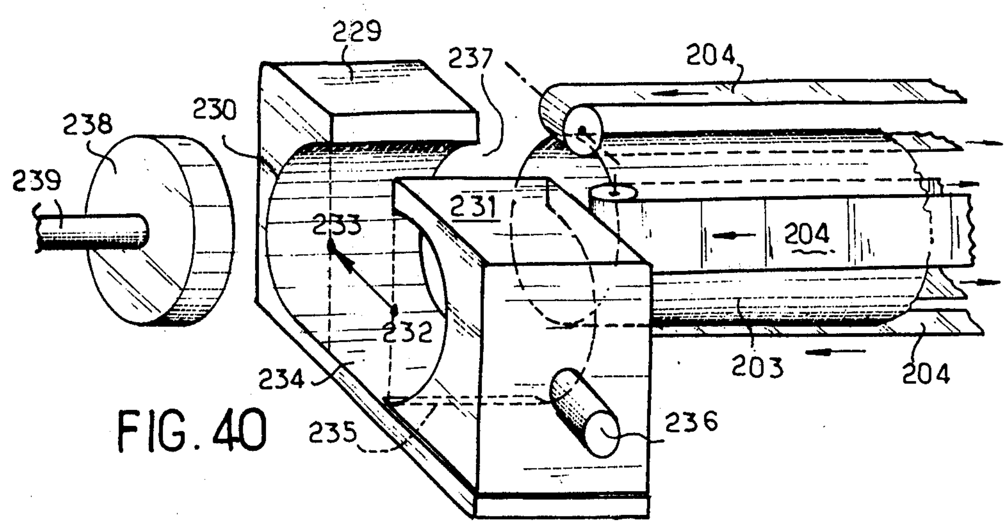
Figure 36:
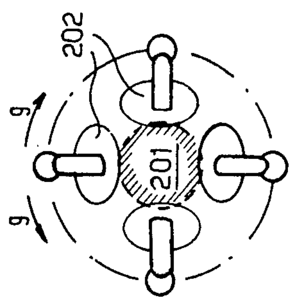
Figure 38:
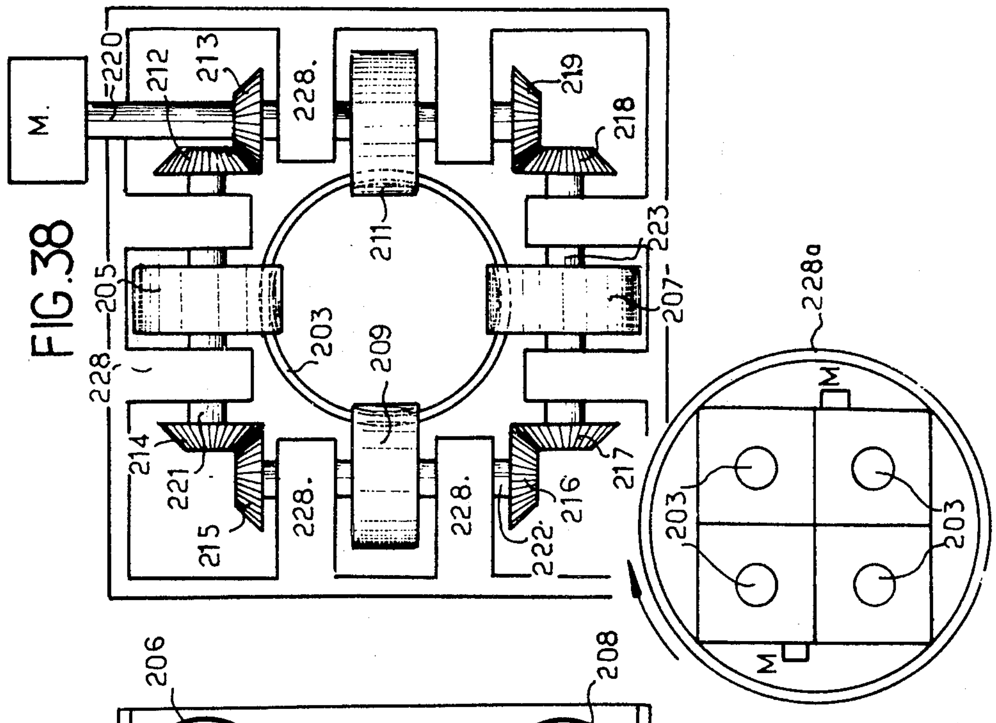
Figure 39:
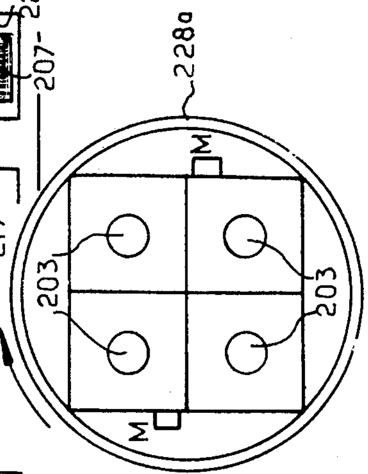
Figure 37:
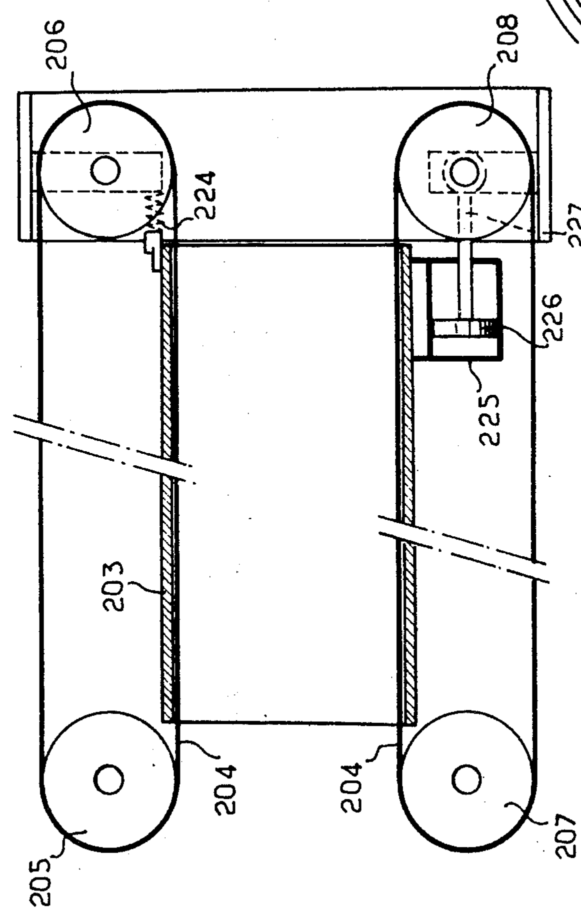
Figure 42:
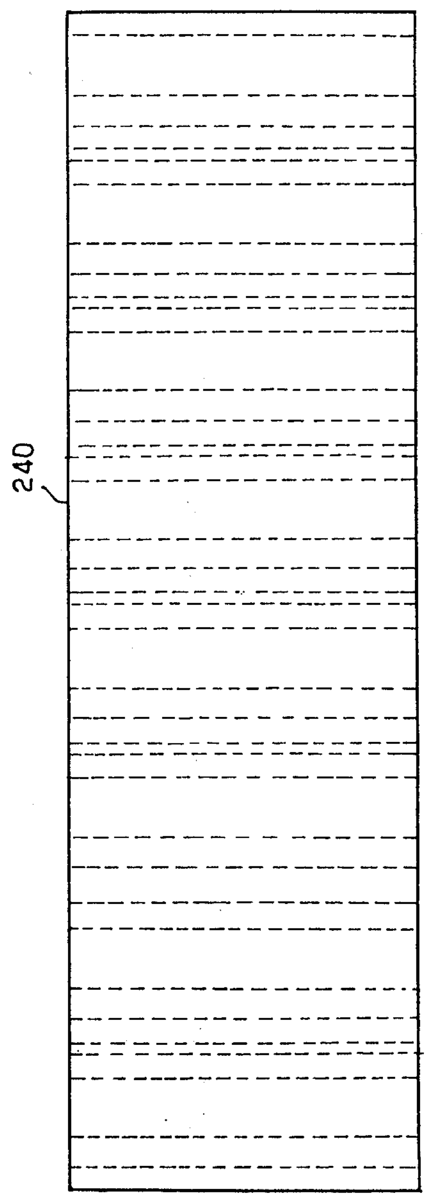
Figure 41:
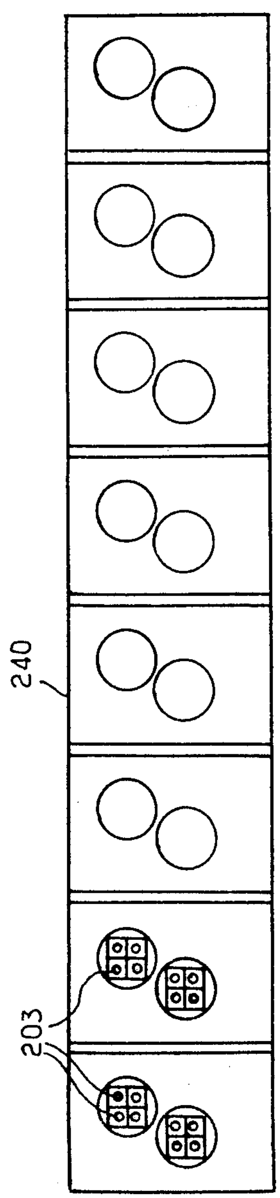

FIG. 36 is a partial projection, in elevation;

FIGS. 37 and 38 show in section and in elevation a tube having internal drive belts;

FIG. 39 shows a set of four tubes in a rotating drum;

FIG. 40 is a perspective view showing the apparatus for inserting the meat into tubes;

FIGS. 41 and 42 show the plant for refrigerating the shaped portions.

Figure 1:
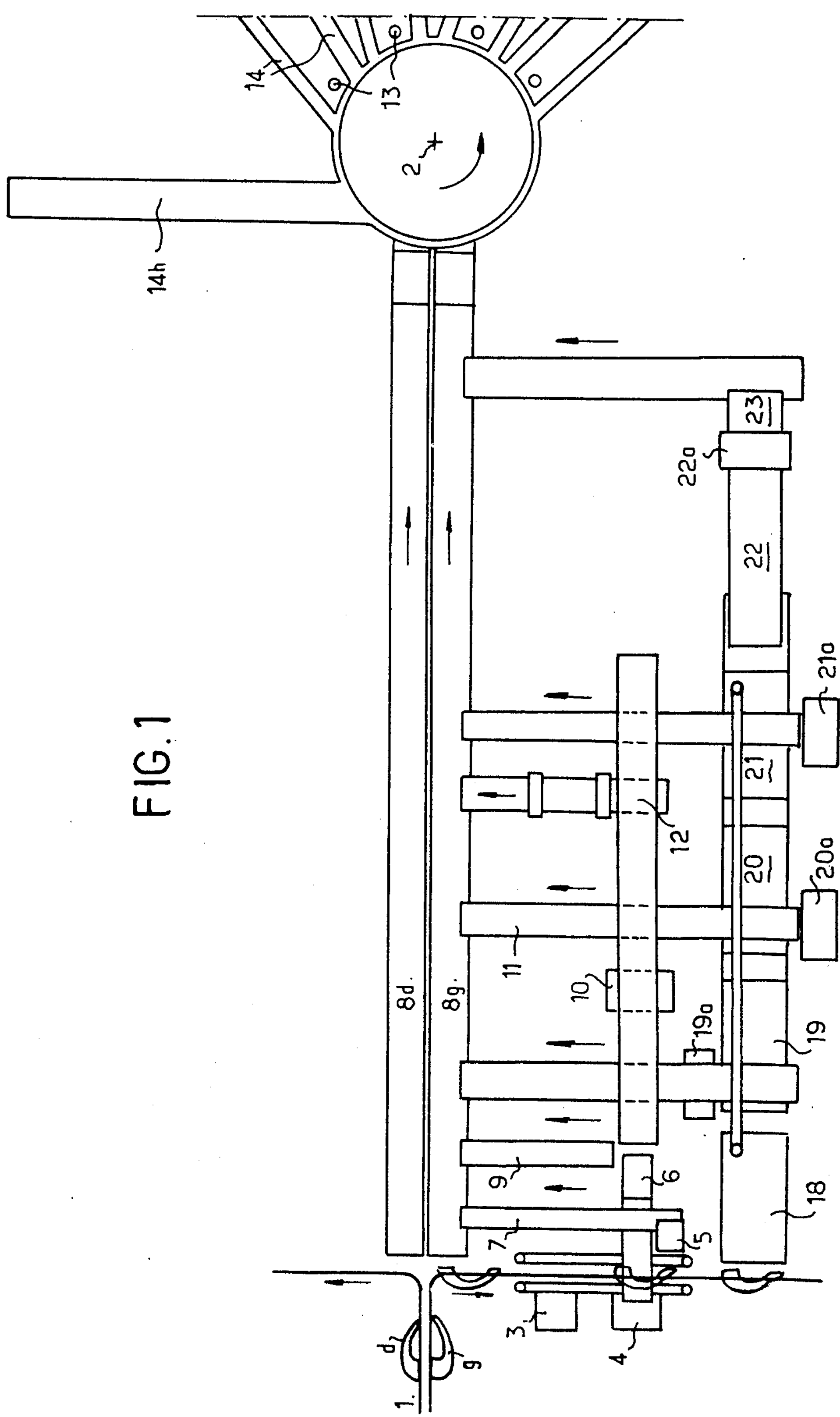
FIG. 1 is an overall view of the boning plant.

FIG. 1 shows a general plan of the boning plant. It has an axis of symmetry from an intake 1 on the left of the drawing as far as the axis 2 of a distribution platform. Only the installations and operations corresponding to the lower part of the drawing in FIG. 1 will be described.

two very closely disposed planes, one containing the even row of cutters, the other those of the odd row.

Figure 16A:
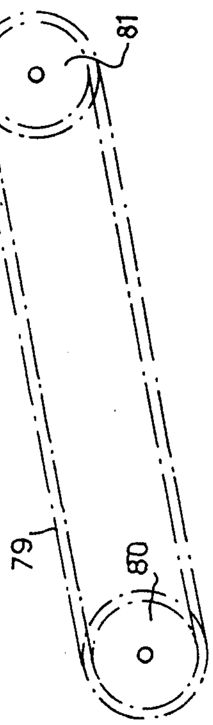

FIGS. 16, 16*a*, 17 jointly show the neck boning apparatus. 77 is a U-shaped frame in which the neck is engaged. A slot 78 in its bottom allows passage for a sprocket chain 79 inclined in a vertical plane, with a slope of the order of 20°. This chain is caused to move by two gearwheels 80, 81, one of which is a driving wheel. The frame is closed in its upper part, on one side by a fixed closure means 82, and on the other by a closure means 83 which slides horizontally and which is pushed towards the fixed closure means by a piston 84 sliding in a cylinder 85 connected to the frame.

The neck 86 is introduced into the frame above the chain 79, the bone 86a being in the upper part, gripped between the closure means 82, 83.

An assembly of cutters 87 of the type already described in directed between the bone and the flesh in order that this latter may be progressively detached while the inclined chain 79 drives the neck, lifting it progressively and causing it to turn around the bone which becomes detached and which is finally thrown off to the right of the drawing in FIG. 17 while the meat emerges at the right of FIG. 16. The chain 79 is of course provided with a roughened surface to facilitate propulsion of the meat.

Superposed on the translatory movement of the neck which is transmitted by the chain there is an alternating movement of a magnitude substantially equal to the distance between centres of two cutter axes. This additional movement is provided by known means, preferably communicated to the tool carrying the cutter assembly.

FIG. 18 shows in elevation the apparatus for boning the leg and the "marrow bone", FIG. 19 shows an enlarged detail of this. Reference numeral 88 shows a frame for a lathe shaft 89 having a pulley 90 driven by a belt 91. A box 92, open, provided in the bottom with a regulable wedge 93, can fix the leg or the marrow bone by one of its ends, gripping it between the wedge 93 and an opening 94. The other end of the bone is jammed onto the point 95 of the shaft 89 which is axially regulable by known means, not shown. An annular member 96 engages around the bone and is moved by translation thanks to a threaded rod passing through a nut 97 in the member 96. The means of operating this rod and of providing for disengagement are now shown.

The annular member 96 supports one or more rods 98 carrying levers 98*a* articulated at 99 and at their end a rotary cutter, the operating means of which not shown, are similar to those described (FIG. 10). The articulation 99 are provided with springs which apply the cutters 100 onto the bone to be removed. In order to avoid the cutters cutting into the bone, they are accompanied by two sensors 101 and 102 capable of penetrating the meat but not the bone, and which are so adjusted that the line of their ends can be inclined, passing through the cutting edge of the cutter. According to a known means, two sliding rods carrying the cutter and the second sensor within the arm 98*a* will be connected to one and the same fixed gear pinion and also the central sensor. Other known alternative mechanical constructions may be used for maintaining alignment.

FIGS. 20 and 21 shown in elevation and in plan view and FIG. 22 shows in partial projection according to XX in FIG. 21, the assembly of means for boning the shoulder after it has been removed. A work table 103 carries from left to right a first lowered drive belt 104 with its drive cylinders 105 and 106, above it three belts 110, 111, 112 are separated by two working stations 113, 114 fixed to the table 103. The shafts operating the three belts supported by the table 103 are identified by reference numerals (115, 116), (117, 118), (119, 120). The belt 111 is divided into two, so having a separation in which the edge of the shoulder will engage after removal of the lower meat 128, while the bone of the shoulder will rest flat on the two parts of the belt 111. The shoulder 121 is deposited on the belt 110, flat part in front, with the shoulder blade underneath. The station 113 has two vertical cutters 122, 123 between which the shoulder blade engages, and on either side of these cutters, horizontal cutters 124 situated substantially at the level of the horizontal plane and touching the top of the vertical cutters. These cutters 124 are covered by a casing 125 which protects them.

The shaft 116 is adjusted in height so that the bone 130 of the shoulder (FIGS. 20 and 22) engages above the horizontal cutters 124 with the blade 131 between the vertical cutters (FIGS. 22), the meat 128 situated in the lower part of the shoulder being detached and falling onto the belt 104 which carries it, while the bone, carrying the upper meat 129 engages the double belt 111 which will carry it to the working station 114 comprising a row of horizontal cutters 126 protected by a housing 108. The shaft 118 of the double belt is so regulated that the shoulder bone, the upper part of which is flat, engages beneath the cutters 126 and is in contact with them. The upper meat 129 will then be detached and engage the housing 108 then the upper belt 112 while the bone, now freed of all its meat, drops into a transverse lower belt 107 or onto a simple inclined surface causing it to drop onto a bone discharge belt, not shown. It will be seen that the lower meat 128 has fallen onto the belt 104 and the upper meat 129 onto the belt 112; both are now carried to the central belt 8 already described with reference to FIG. 1.

There now follows a description of the boning operations performed on a second track at stations 18, 19, 20, 21 in FIG. 1. FIG. 23 shows the remaining carcass laid flat and straightened. The bones are underneath and are indicated by dotted lines. A broken line 130–131 indicates the upper region where meat will be removed at the first station 19, the line 130 being substantially at 2 cm distance from the entrecote nut. It is traced with a knife to allow positioning of the equipment, and is extended according to the line 132 for removal of the flank. A second contour 130, 133 indicates the area of removal at the second station 20 mainly above the spinal column. A cut is then made on the line 134, detaching the thigh which will be processed subsequently. At the third station 21, then, the meat comprised between the lines 130–133–134 is removed. In the opposite region, between the lines 133 and 134, there is no longer any meat to be removed.

FIGS. 24 and 25 show the carcass placed flat on an inclined plane 135, pulled by the hook 136 which straightens and lifts the leg. At the right-hand end of the table there is a wheel 137 and a guide 138, both circular. The wheel engages into the "marrow trough" and the vertebrae are supported laterally on the guide. The table 135 is followed by a horizontal table 139 provided with a drive chain guided by two pinions 140 and 141 which define a first inclined region of the chain, the particular links of which are adapted to grip the vertebral column of the carcass, to propel it, guiding it aligned on the chain, the said vertebral column then serving as a reference axis for the ensuing operations.

FIG. 26 shows a partial diagrammatic section through one of the said links viewed in the direction of the arrow in FIG. 25.

Reference numeral 143 denotes a hinging axis of two links having a head 144 and a nut 145. 146 denotes the extreme hinged part of a link, the rest of which is not shown. The articulated adjacent link, hinged on the same axis 143 is shown in partial section. It comprises a part 147 guided between a straight fixed rail 151 and an intermediate rail 150, and a part 146 sliding in the first, a rod 152 fixed to the part 147 sliding in the opening 153 in the part 148. The part 147 has a claw 154 adapted to penetrate into the "marrow trough" in the carcass and the part 155 has a counter-claw which is clamped on the bone by return springs 149 which tend to clamp the part 148 on the part 147, while the intermediate member 150 of variable width has its straight edge holding apart the members 147 and 148 prior to gripping of the spinal column 156. Shown on the carcass is a rib 157 which terminates at the "bit end bone" 158.

The arrow 130 shows the aforesaid cutting line (FIG. 23) corresponding to the "first" cutting station which is going to detach all the meat from the ribs situated on the left of the arrow 130, while at the "second station", all the meat adhering to the spinal column to the left of the arrow will be detached.

With reference now to the two similar diagrammatic projections 27 and 28, the apparatus which bones the breast (FIGS. 23 and 26) at "station one" will be described, the carcass being held as indicated in FIG. 25, reposing on the table 139.

A U frame 159 supports a shaft 160 which carries in a case 161 an assembly of identical tools, 13 in number in the drawing, shown individually in profile in FIG. 28. Each of these tools comprises a balde 162 sliding in two openings 163 in the casing 161 and surmounted by a guide 164 sliding in a groove 165 enclosing a compression spring 166. The tool also comprises above each blade an easily compressible elongated support 167 carrying a cutter 168, the mechanical control of which is indicated only by a shaft 169 connected to the tool. Each blade is terminated at 170 by a cutting edge. A view in section about the line B shows at 171 the shape of the blade having lateral cutting edges.

Furthermore, the frame 159 can oscillate about an axis 172 connected to a support 173 not shown, capable itself of a translatory movement in the longitudinal direction of the tools.

The apparatus is then used as follows. The frame is moved forwards, the cutter blades directed downwardly into the cut 130. The blades penetrate between the ribs and the cutters come in contact with them and detach the meat which is carried progressively to the rear, to the right in FIG. 26, by the rearwards movement of the support 173, while a slight inclination about the axis 172 occurs naturally so that the line of blades matches the variable inclination of the ribs. So that the blades can effectively penetrate between the ribs despite the variation is size of animals and despite the intercostal deviations, tools will be mounted on the shaft 160 in such a way that there is a certain flexibility in the articulations, known means being used but not being shown in the drawings. By reason of the springs 166, the blades may move aside when they abut against the "big end" bone of the breast 158.

The half-carcass is then carried to the "second station" and there now follows a description of the apparatus for boning the line of ribs shown in plan view in FIG. 29 and in profile in FIG. 30. A double bracket 174 is capable of horizontal movement shown diagrammatically by two sleeves 175 each sliding on a guide tube 176. The bracket having two horizontal arms 177 supporting a shaft 178 allowing a second U-shaped support 170 to adopt an inclined position. A casing 180 is held between the arms of the U by a double rectangular slideway 181 permitting of a reciprocating horizontal translatory movement of approximately 3 cm magnitude. This movement is obtained by known means symbolised by a casing 182 connected to the support 179 and into which penetrates the slideway 181 of which a point 182 will be controlled by a connecting rod-crankshaft system 183. The casing 180 comprises a shaft 184 about which are elastically articulated an assembly of arms 185 which are ended by small cutters of approximately 3 cm diameter. The articulations have at the same time a transverse elasticity, the amplitude of which is limited by guides 186 passing through apertures 187 and provided with stops 188. The arms 185 are also compressible in their length by means which are not shown in the drawing.

In order to detach the "line of ribs", the double bracket slides into a suitable position, the U-shaped support is inclined in order to direct downwardly all the arms which move in isolation and in elastic fashion to allow the cutters to be introduced between the ribs and then to follow the irregularities of the chine which can be seen in FIG. 26. The preferred semi-automatic apparatus will be managed by a specialist.

The carcass is then moved to "station three" guided by the aforesaid chain and pulled by the hook 136. A blade will cut off the thigh according to the line 134 shown in FIG. 23 and this thigh is carried away by its hook to be treated in a subsequent station (FIGS. 31 to 36). Boning at the "third station" takes place at this moment using the same machine and the same operation as in "station two".

Boning of the thigh will now be described, involving a first operation described with reference to FIG. 31, an elevational view, and 32, a plan view.

A conveyor belt 189 is driven from left to right by a friction clutch on shaft 190. The thigh is placed on the belt, the tail bone 191 and the chump end bone 192 on the left. A hook is introduced into the "bone hole" at 193 attached to the cable 194 connected to a fixed point at the end of a suspended support 195 for example.

As assembly of rotating cutters 196 aligned on a curve suspended by an articulated system 197 from a vertically movable shaft balanced by a counterweight 199 is adapted to lift the chump end bone and detach it while the belt carries away the thigh to the following station (FIGS. 33 and 34).

A knife, not shown, acting as indicated by the arrow F, detaches the rump on the left. A frame 241 encloses the belt 198 and carries at 242 a series of horizontal rods provided with articulations 243 for downwardly directing at an angle of 10° to 20° by elastic pressure means not shown, an assembly of cutters, the centres of which are aligned in accordance with a curve which can be seen in FIG. 34 which is regulated so that all the cutters are capable of detaching the portion marked by the shaded area (FIG. 33).

The rest of the thigh then passes to the station indicated diagrammatically by the FIG. 35 in elevation and FIG. 36 in profile. A pair of rollers 200 having the same axis and continguous, or better two successive pairs of increasing diameter raise the knuckle 201 which engages in an arc of inclined cutters 202. The rollers 200 then eclipse each other laterally and the full weight of the thigh is then resting on the arc of cutters. The pressure exerted on the lower cutter then automatically triggers a flexible re-gripping (arrows *f* in FIG. 35) of all the cutters around the bone of the thigh, the open are becoming a frustoconical ring. At the same time, there is a rotary movement of this ring which may be continuous or which may consist of alternate oscillations (arrows g in FIG. 36) of an amplitude substantially equal to the angular divergence of two cutters. The knuckle 201 is first fed forwards to 201*b* by the joint action of the belt 189 and the cylinders 200, then the action of the belt alone. Finally, the bones pass through the ring of cutters and all the meat separated is carried off outside on the belt 189, then on a transverse belt which empties it onto the central belt 8, the thigh bones being discharged onto a separate belt, not shown.

Figure 2:
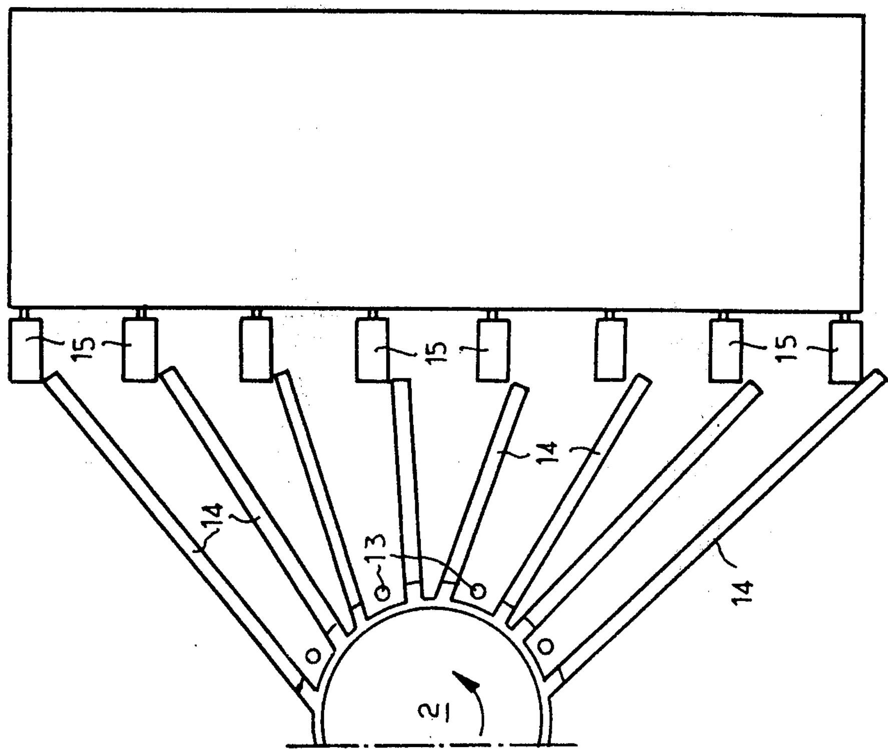
FIG. 2 is a diagram showing the distribution system for shaping.
Figure 3:
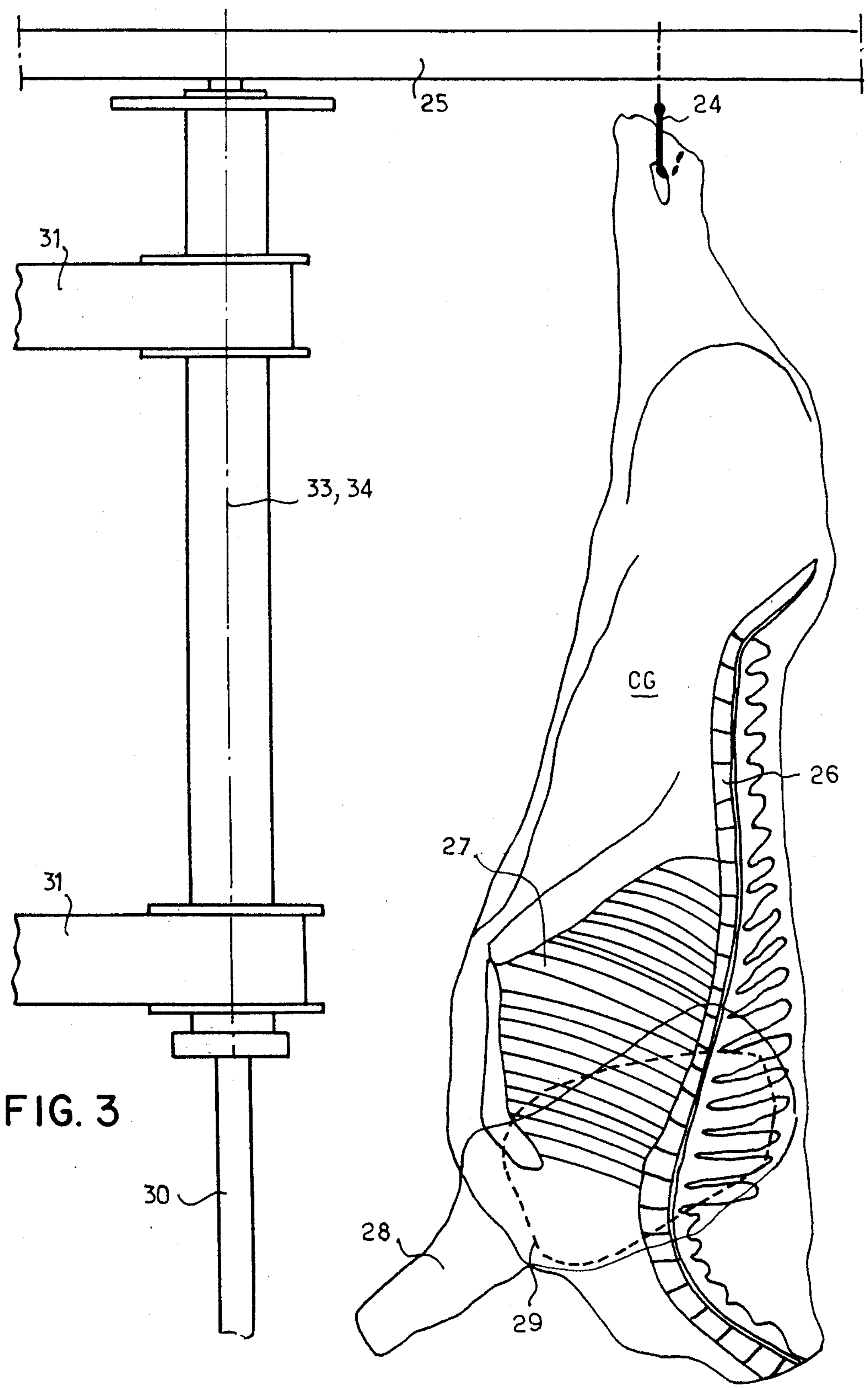
FIGS. 3 and 4 show the arrival of a half-carcass on a first track, in elevation and in plan view.
Figure 4:
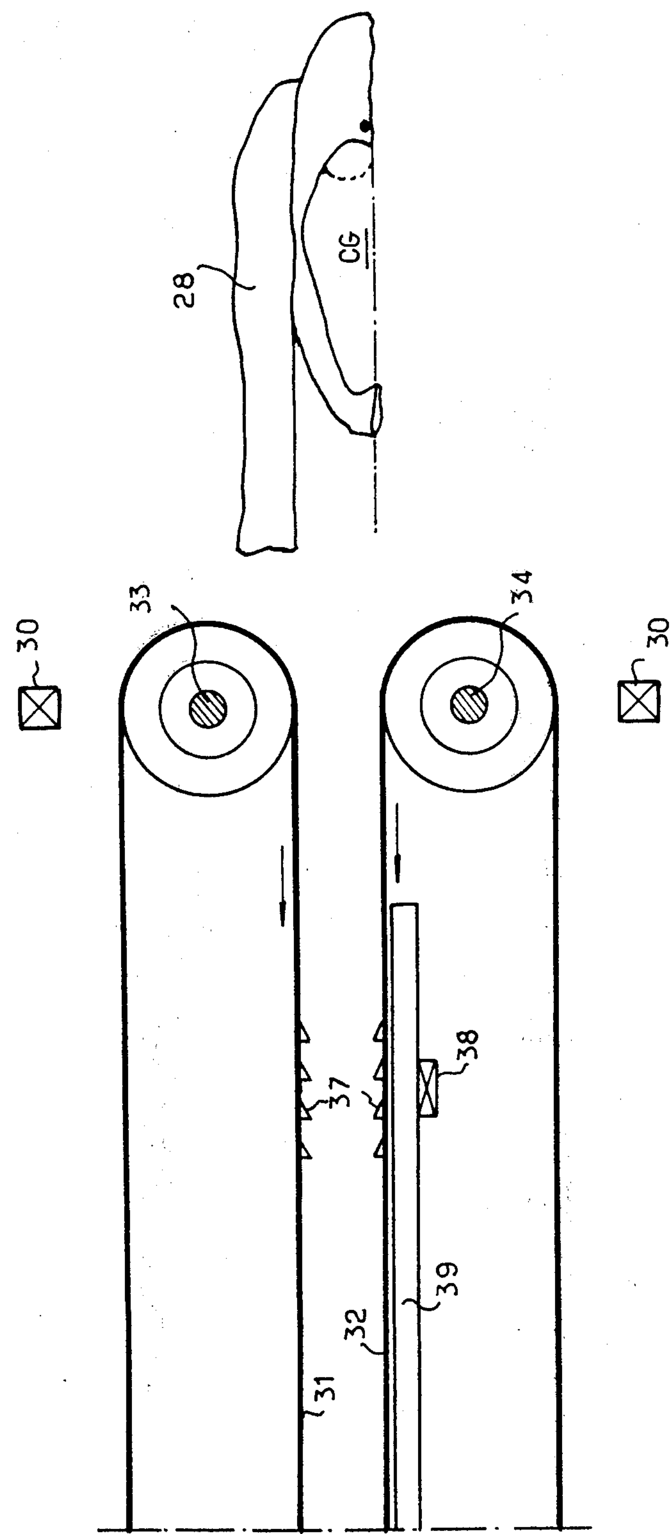
Figure 5:
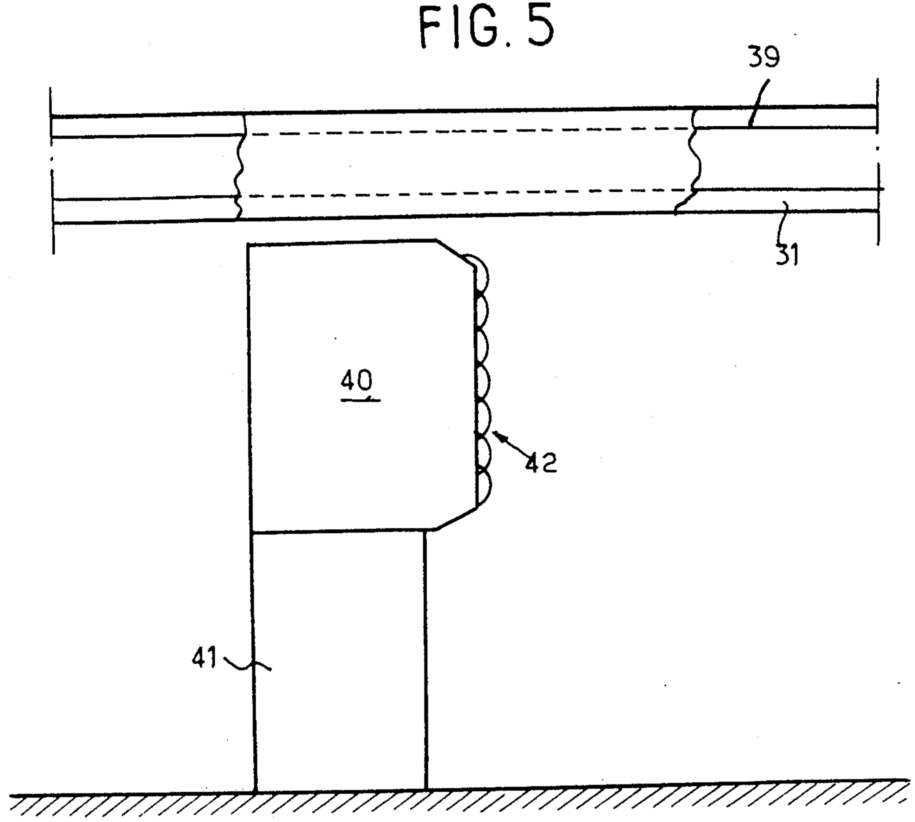
FIGS. 5 and 6 show the shoulder removing apparatus in elevation and in plan view.
Figure 6:
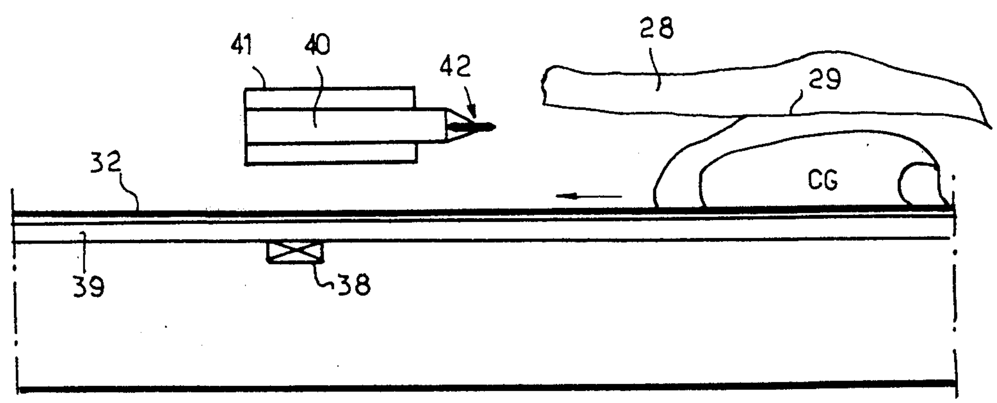

There now follows a more detailed description of the machines and operations involved in preparing the cuts. The various cuts of meat resulting from the operations already described have been carried on the conveyor belt 8 to the rotating platform 2 (FIG. 2) and have been distributed to the 8 stations 15 by the four orientators.

FIGS. 37 and 38 show in profile and in frontal view a shaping tube having a wall 203. This tube is shown as a cylinder with a circular base but this base may be oval or of more complex shape. This tube is lined on the inside by a plurality of identical conveyor belts such as 204 passing around pulleys such as 205 and 206, 207 and 208. All the belts, four in the example of application shown in FIGS. 37 and 38, turn simultaneously, thanks to sets of conical gears 212, 213–214, 215–216, 217–218, 219, carried by spindles 220, 221, 222, 223 turning in bearings 228. One of the shafts, such as 220, is operated by a motor M. Belt tensioning means are provided represented diagrammatically by the provision of the system of pulleys 206, 208 on one of the ends of the tube at least in a casing connected to the tubes through compression means such as springs 224 for example, or better still pistons maintained under constant pressure, of which the body 225 is fixed to the tube and the piston 226 to the support 227 of each pulley.

FIG. 39 shows, viewed from the front, a turret 228 comprising four tubes identical to those which have just been described. Means, not shown, provide for rotation of this turret by quarters of a turn, preferably every 20 minutes, for the successive charging of each of the four tubes which constitute the turret, in a cycle of 4 × 20 minutes.

FIG. 40 is a perspective view of the means of introducing the meat into one of the four tubes 203 of each turret. Three of the belts 204 are partially illustrated.

A meat insertion case comprises a part 229 which is fixed and which is internally shaped in a half-contour 230 as an extension of the tube 203. A movable part 231 is also internally shaped as a half-contour capable of a movement 232, 233 defining an open position and a closed position, for which the two half-contours complete each other to make a single "cylinder" in prolongation of the tube 203 which may be cylindrical or not.

The fixed part 229 has a flat end 234 against which the bottom edge 235 of the moving part 231 scraps, the translatory movement of this latter being provided by a rod 236. The meat is introduced into the case through a top aperture 237 which exists when 231 is in the open position. The closing of the movable part 231 therefore shapes the meat in cylindrical fashion or otherwise. A piston 238 with shaft 239 then pushes the meat according to the common axis of the half-contours and introduces it into the tube 203 where the belts 204 carry it to the end of the tube at a speed which can be regulated to keep the meat under compression.

FIG. 41 shows a plant 240 comprising eight pairs of turrets, each of which has four tubes of the type 203. FIG. 42 is a plan view of this installation. It comprises refrigerating means, not shown, which bring the outer surface of the meat to the vicinity of 0° upon emergence from the tubes, so ensuring the retention of its shape. On leaving this installation, the shaped meat is kept in storage rooms represented at 17 in FIG. 2. Thanks to the speed with which the hot meat is treated, the invention permits not only of shaping but above all of conservation 20 times superior to those of the prior art.

The foregoing descriptions are given by way of example of embodiment of the method. Various alternatives are possible at each working station without departing from the scope of the invention, and quite particularly with regard to the continuous or discontinuous means of shaping, these processes being possibly performed by other known technical means which produce the same result.

We claim:

1. A plant for boning the meat of the half-carcass of a skinned beast, comprising for each half-carcass rail means provided with suspension hooks on which the half-carcass is suspended from the rear knuckle, means for propulsion of the warm and still supple half-carcass on a first track between two pairs of belts rotating about vertical axes which provide for its translatory movement, at a first station on said first track cutting means for removing the shoulder during movement of the half-carcass, at a second station on said first track, means for cutting the neck and means for removing the fillet, top, top flank, thin flank, membrane, filet mignon and tail; on a second track substantially perpendicular to the first track, where the portions detached on the first track are carried by a conveyor belt, means for boning the neck, means for boning the leg and marrow bone, the latter means including a lathe adapted to receive a plurality of rotary cutters which are elastically applied around the bone, means for boning the shoulder blade originating from removal of the shoulder carried flat by a conveyor belt to two successive stations where one set of cutters detaches the lower meat and the top meat; on a third track parallel with the second where the residual half-carcass is carried by its suspension hook on an inclined plane where a spring and a guide are capable of straightening the vertebral column which is gripped then by a driving chain having elastic hooks carrying the residual half-carcass to a first station for cutting off the breast using a semi-automatic tool comprising cutters associated with cutting blades, while the flank is detached by hand, by a specialist, then to a second station for removal of the ribs by another set of cutters penetrating between the ribs, and between the projections on the vertebral column, a blade then cutting off the thigh which is carried away and processed later, then to a third station where a set of cutters identical to that of the second station is operated in a similar manner; a conveyor belt with a friction gear drive driving the said cut-off thigh, supported by a hook in the bone hole, a curvilinear set of cutters detaching the chump end bone, a knife detaching the rump, the rest of the thigh being carried away, a curved set of cutters cutting off the top rump, the bone lifted by the rollers and engaged in an arc of cutters clamping elastically around the thigh with an oscillating rotary movement adapted to detach the meat from the bone.

2. A plant according to claim 1, wherein the said means for removal of the shoulder, removal of the fillet, boning of the neck, breast, ribs, chump end bone, top rump, each comprise an assembly of rotary cutters substantially in contact with one another, each formed of two cutting blades rotating in opposite directions, each of the said cutters being held in a rod having degrees of freedom and connected to elastic means allowing the extreme cutting line of the cutters to match a variable curve, all the rods being held in a support having further degrees of translatory and rotary freedom, the said support being balanced and operable by hand.

3. A plant according to claim 1, wherein the means of boning the neck comprise an inclined chain carrying the neck into a U-shaped frame, the bone being gripped between a fixed closure means and a movable closure means which is pushed horizontally towards the first-mentioned closure means, cutters driven with a reciprocating movement alternately and substantially parallel with the chain drive progressively detaching the bone from the meat.

4. A plant according to claim 1, comprising a boning tool comprising a rotary cutter and two adjacent sensors so arranged that they cannot penetrate the bone, one at least of the sensors being slideable, the support of the said cutter and the two sensors being in mechanical connection by known means such that, since the ends of the sensors define a line of variable inclination, the said line constantly passes through the cutting edge of the said cutter.

5. A plant according to claim 1, comprising means for securing on the lathe, in succession, the leg and the marrow bone which are driven with a rotary movement while at least one boning tool according to claim 4 is elastically applied against the bone without penetrating it, the said tool being fixed on a support which is driven with a translatory movement around the axis of the lathe.

6. A plant according to claim 1, comprising a plurality of belts for driving the shoulder, subjecting this latter to a group of rotary cutters which detach the meat from the lower face of the shoulder on either side of its edge, and to a further group of cutters for detaching the meat from the upper face of the said shoulder.

7. A plant according to claim 1, wherein the said tool for boning the breast comprises cutters substantially of 5 cm diameter and, with each cutter carrying rod, a cutting blade which is elastically mounted and adapted to penetrate between the ribs and to move aside elastically at the end of its stroke when it abuts against the bone of the "big end of the breast".

8. A plant according to claim 1, wherein the said tool for boning the ribs comprises cutters of substantially 3 cm in diameter, a casing carrying the cutters having in its support a transverse reciprocating translatory movement of substantially the same amplitude as the diameter of the cutters, the said support also comprising inclining and propelling means.

9. A plant according to claim 1, wherein the said tool for boning the chump end is retractable and has cutters which are elastically disposed in curvilinear fashion and adapted to match the shape of the chump end bone to detach it while the thigh is driven on a conveyor belt.

10. A plant according to claim 1, wherein the said tool for cutting the top rump comprises a curvilinear assembly of substantially horizontal cutters adapted to detach the top rump while the thigh is driven by a conveyor belt.

11. A plant according to claim 1 comprising means for boning of the thigh after removal of the chump end bone, cutting out of the rump then the top rump, the said means comprising a plurality of cutter-carrier rods capable of clamping around the bone when the said bone, carried by a conveyor belt and lifted by at least one retractable roller is offered up between the said cutters, of which the rods supporting them are held by a support capable of rotary movement around the bone which continues to be moved by the conveyor belt on which it rests at its other end.

12. A plant as claimed in claim 1, further comprising a plurality of successive conveyor belts carrying the detached meat to a distributing station where the meat is introduced into tubes having internal conveyor belts and shaped by refrigeration of its outer surface to below 0°.

13. A plant according to claim 12, wherein the tubes return runs of the said belts pass outside the tubes, the plant further comprising a casing for introducing ans shaping the meat comprising a fixed part which is internally shaped to be an extension of half the wall of the tube, and a complementary part capable of two positions, opened and closed, internally shaped when in the closed position to be an extension of the complementary half of the wall of the tube, the said complementary part, when in the open position, permitting introduction of the meat into the casing, the said meat being shaped in the form of the tube by closure of the complementary part of the casing, a transverse piston of the same shape being capable of pushing the meat out of the casing in order to introduce it into the tube.

14. A plant according to claim 13, comprising at least one turret comprising four shaping tubes, the said turret being capable of rotations through a quarter of a revolution bringing the four tubes successively into the filling position by means of the common meat inserting casing, the said turret transversing a refrigerating plant of known type, the rate of feed of the belts in the tubes being such that the continuous passage of the meat takes substantially 20 minutes, resulting in a cylce of 80 minutes per turret, the shaped meat superficially achieving a temperature of substantially 0°.

15. A plant according to claim 13, characterized by a refrigerating chamber having a plurality of pair of adjacent turrets adapted each to be filled by a distributor.

* * * * *